United States Patent
Takahashi et al.

(10) Patent No.: US 9,313,775 B2
(45) Date of Patent: Apr. 12, 2016

(54) WIRELESS TRANSMISSION APPARATUS, WIRELESS RECEPTION APPARATUS, WIRELESS COMMUNICATION SYSTEM, AND CONTROL PROGRAM AND INTEGRATED CIRCUIT OF WIRELESS TRANSMISSION APPARATUS

(75) Inventors: Hiroki Takahashi, Osaka (JP); Yasuhiro Hamaguchi, Osaka (JP); Kazunari Yokomakura, Osaka (JP); Osamu Nakamura, Osaka (JP); Jungo Goto, Osaka (JP)

(73) Assignee: SHARP KABUSHIKI KAISHA, Osaka (JP)

( * ) Notice: Subject to any disclaimer, the term of this patent is extended or adjusted under 35 U.S.C. 154(b) by 421 days.

(21) Appl. No.: 13/879,974

(22) PCT Filed: Oct. 7, 2011

(86) PCT No.: PCT/JP2011/073260
§ 371 (c)(1), (2), (4) Date: May 8, 2013

(87) PCT Pub. No.: WO2012/053382
PCT Pub. Date: Apr. 26, 2012

(65) Prior Publication Data
US 2013/0279439 A1    Oct. 24, 2013

(30) Foreign Application Priority Data
Oct. 18, 2010    (JP) .................... 2010-233950

(51) Int. Cl.
*H04W 72/04* (2009.01)
*H04L 27/26* (2006.01)

(52) U.S. Cl.
CPC ........... *H04W 72/04* (2013.01); *H04L 27/2623* (2013.01); *H04L 27/2636* (2013.01)

(58) Field of Classification Search
CPC .................................... H04L 27/2623
See application file for complete search history.

(56) References Cited

U.S. PATENT DOCUMENTS

2007/0242600 A1* 10/2007 Li et al. .................... 370/210
2008/0214126 A1* 9/2008 Holt .............................. 455/93
(Continued)

FOREIGN PATENT DOCUMENTS

JP    2001-268050 A    9/2001
JP    2008-219144 A    9/2008
(Continued)

OTHER PUBLICATIONS

Okada et al., "Spectrum Shaping Technique Combined with SC/MMSE Turbo Equalizer for High Spectral Efficient Broadband Wireless Access Systems", ICSPCS2007, Gold Coast, Dec. 2007, 7 pages provided.

*Primary Examiner* — Kodzovi Acolatse
(74) *Attorney, Agent, or Firm* — Birch, Stewart, Kolasch & Birch, LLP

(57) ABSTRACT

There is implemented a clipping technique that does not require a reception apparatus or a transmission apparatus to notify a transmission apparatus or a reception apparatus of information on clipping. A wireless transmission apparatus performs clipping processing not to transmit a spectrum of part of a frequency domain signal when transmitting data to a wireless reception apparatus and determines a frequency band to be subjected to the clipping processing using information other than information notified from the wireless reception apparatus and directly specifying a frequency band to be subjected to the clipping processing.

16 Claims, 20 Drawing Sheets

(56) References Cited

U.S. PATENT DOCUMENTS

| | | |
|---|---|---|
| 2008/0247487 A1* | 10/2008 | Cai et al. .................. 375/296 |
| 2008/0267312 A1 | 10/2008 | Yokoyama |
| 2009/0080556 A1 | 3/2009 | Duan et al. |
| 2009/0098042 A1* | 4/2009 | Gruber ...................... 423/613 |
| 2009/0129257 A1* | 5/2009 | Maltsev et al. ............. 370/208 |
| 2009/0232249 A1* | 9/2009 | Hamano .................... 375/295 |
| 2009/0262758 A1* | 10/2009 | Kobayashi et al. .......... 370/480 |
| 2010/0097923 A1* | 4/2010 | Zhao et al. ................. 370/210 |
| 2010/0104041 A1* | 4/2010 | Ibi et al. .................... 375/285 |
| 2010/0284493 A1* | 11/2010 | Bona et al. ................. 375/316 |
| 2011/0044377 A1* | 2/2011 | Ibi et al. .................... 375/133 |
| 2011/0107174 A1* | 5/2011 | Liu et al. .................... 714/752 |
| 2011/0200071 A1 | 8/2011 | Hamaguchi et al. |
| 2011/0286550 A1* | 11/2011 | Mirbagheri et al. ......... 375/296 |

FOREIGN PATENT DOCUMENTS

| | | |
|---|---|---|
| JP | 2009-81831 A | 4/2009 |
| WO | WO 2007/088583 A1 | 8/2007 |
| WO | WO 2010006469 A1 * | 1/2010 |
| WO | WO 2010/016355 A1 | 2/2010 |

\* cited by examiner

FIG.3

| NUMBER OF ALLOCATED RESOURCES($N_R$) [RB] | NUMBER OF CLIPPINGS($N_R$) [RB] |
|---|---|
| 1~2 | 0 |
| 3~5 | 1 |
| 6~8 | 2 |
| 9~12 | 3 |
| 13~16 | 4 |
| 17~20 | 5 |

FIG. 7

| NUMBER OF ALLOCATION RESOURCES($N_R$) | 1 | 2 | 3 | 4 | 5 | 6 | 7 | 8 | 9 | 10 |
|---|---|---|---|---|---|---|---|---|---|---|
| NUMBER OF CLIPPINGS($N_{CLIP2}$) | 0 | 1 | 1 | 2 | 1 | 3 | 3 | 2 | 3 | 2 |
| DFT SIZE($N_{DFT}$) | 1 | 3 | 4 | 6 | 6 | 9 | 10 | 10 | 12 | 12 |
| NUMBER OF ALLOCATION RESOURCES($N_R$) | 11 | 12 | 13 | 14 | 15 | 16 | 17 | 18 | 19 | 20 |
| NUMBER OF CLIPPINGS($N_{CLIP2}$) | 4 | 4 | 5 | 4 | 5 | 4 | 3 | 6 | 6 | 5 |
| DFT SIZE($N_{DFT}$) | 15 | 16 | 18 | 18 | 20 | 20 | 20 | 24 | 25 | 25 |

*FIG.11*

| MODULATION SCHEME(P) | CODING RATE(Q) | CLIPPING RATE($R_{CLIP3}$) |
|---|---|---|
| QPSK | 1/2 | 0.3 |
| | 2/3 | 0.25 |
| | 3/4 | 0.2 |
| 16QAM | 1/2 | 0.1 |
| | 2/3 | 0.05 |
| | 3/4 | 0 |

FIG.14

| MODULATION SCHEME(P) | CODING RATE(Q) | USED TABLE |
|---|---|---|
| QPSK | 1/2 | TABLE#1 |
| | 2/3 | TABLE#2 |
| | 3/4 | TABLE#3 |
| 16QAM | 1/2 | TABLE#4 |
| | 2/3 | TABLE#5 |
| | 3/4 | TABLE#6 |

FIG.17

| RANK(L) | CLIPPING RATE($R_{CLIP4}$) |
|---|---|
| 1 | 0.3 |
| 2 | 0.28 |
| 3 | 0.25 |
| 4 | 0.22 |

*FIG.18*

| RANK(L) | USED TABLE |
|---------|------------|
| 1 | TABLE#7 |
| 2 | TABLE#8 |
| 3 | TABLE#9 |
| 4 | TABLE#10 |

WIRELESS TRANSMISSION APPARATUS, WIRELESS RECEPTION APPARATUS, WIRELESS COMMUNICATION SYSTEM, AND CONTROL PROGRAM AND INTEGRATED CIRCUIT OF WIRELESS TRANSMISSION APPARATUS

TECHNICAL FIELD

The present invention relates to a clipping technique to share information on clipping between a transmission apparatus and a reception apparatus without increasing the amount of control information.

BACKGROUND ART

Along with increase in the amount of data communication in recent years, the need of a wireless communication system that achieves higher spectrum efficiency is increased. In such circumstances, the standardization of the LTE (Long Term Evolution) standard called the 3.9th generation radio communication standard has been completed and in an uplink (communication from a mobile station apparatus to a base station apparatus), DFT-S-OFDM (Discrete Fourier Transform Spread Orthogonal Frequency Division Multiplexing: also called SC-FDMA (Single Carrier Frequency Division Multiple Access), DFT-precoded OFDM, OFDM with DFT Precoding, etc.) system is used, which can easily maintain orthogonality between mobile station apparatuses at the time of multi-access and allocates a single carrier spectrum to contiguous frequencies in a frequency domain. As the background of this, there is a need for a mobile station apparatus to keep high power use efficiency of a power amplifier with limited transmit power in the uplink, and also the fact exists that the single carrier system is more suitable, which is excellent in PAPR (Peak to Average Power Ratio) characteristics.

As one of methods for improving the spectrum efficiency of the above-mentioned DFT-S-OFDM system, the frequency clipping technique that does not transmit part of a frequency spectrum in the DFT-S-OFDM system is discussed (hereinafter, referred to as Clipped DFT-S-OFDM) (see Non Patent Document 1). In Clipped DFT-S-OFDM, compared to a case where clipping is not performed, usage is available, in which transmission is performed more efficiently with less frequency bands, or a larger amount of information is transmitted using the same frequency bands, and therefore, Clipped DTF-S-OFDM is a useful technique in the current communication environment, in which tight situations of frequency resources are accelerated due to an increase in the number of users and in the amount of information.

FIG. 19 is a block diagram showing a configuration example of a transmission apparatus in the case where Clipped DFT-S-OFDM is used in uplink transmission. The transmission apparatus needs to be notified of various kinds of parameters (number of allocated resources, mapping information, modulation scheme, coding rate, etc.) used in transmission as control information by the reception apparatus before performing transmission of data. Because of this, first, the transmission apparatus extracts control information in a control information extraction unit 105 after down-converting a signal from the reception apparatus received at a reception antenna unit 101 in a radio reception unit 103. The transmission apparatus sets various kinds of parameters to be applied to transmission based on the extracted control information.

The transmission data is first error correction encoded in an encoding unit 107 and then modulated in a modulation unit 109. At this time, the coding rate of error correction coding applied in the encoding unit 107 and the modulation multi-value number applied in the modulation unit 109 are selected, respectively, based on coding rate information 1001 and modulation scheme information 1002 (also referred to as MCS (Modulation and Coding Scheme) etc. as information integrating the two pieces of information) included in control information notified from the control information extraction unit 105. The modulated signal is converted into a frequency domain signal by the DFT (Discrete Fourier Transform) in a DFT unit ill. Here, a size $N_{DFT}$ of an output of the DFT unit 111 (hereinafter, referred to as DFT size) is determined by allocation resource number information 1003 included in the control information output from the control information extraction unit 105. However, it may also be possible to calculate the allocation resource number information using mapping information 1005 indicative of the frequency position of an allocation resource.

Next, a clipping unit 113 clips part of the output of the DFT unit 111 based on clipping information 1004 output from a clipping control unit 115 and outputs signals at the remaining N points. Here, clipping means assuming that the clipped part has no signal and in the present specification, the clipping rate is defined as "1−(number (N) of output components of the clipping unit 113/DFT size ($N_{DFT}$))" ($N_{DFT} \geq N$). The clipped signal is allocated to a subcarrier used in transmission in a subcarrier mapping unit 117. At this time, allocation is performed based on the mapping information 1005 given from the control information extraction unit 105 and zero is inserted into a subcarrier not used in transmission.

An IFFT (Inverse Fast Fourier Transform) unit 119 inverse-Fourier transforms a transmission signal output from the subcarrier mapping unit 117 to convert the transmission signal from a frequency domain signal into a time domain signal. After that, into the obtained time domain signal, a CP (Cyclic Prefix) (signal obtained by copying part of the rear of a symbol after IFFT) is inserted in a CP insertion unit 121. Next, the signal is up-converted into a radio frequency band signal in a radio transmission unit 123 and is transmitted from a transmission antenna unit 125.

On the other hand, in the reception apparatus, it is made possible to restore the transmission data without deteriorating the characteristics so much of the transmission signal whose part of a spectrum is clipped by using the nonlinear iterative equalization (for example, frequency domain SC/MMSE (Soft Canceller followed by Minimum Mean Square Error) turbo equalization) technique.

FIG. 20 is a block diagram showing a configuration example of a reception apparatus using frequency domain SC/MMSE turbo equalization. In the reception apparatus, first, after a signal received at a reception antenna unit 201 is down-converted in a radio reception unit 203, the CP is removed in a CP removal unit 205. The obtained parallel signal is converted by the FFT (Fast Fourier Transform) from the time domain signal into a frequency domain signal in an FFT unit 207 and is separated into a signal for each user in a subcarrier demapping unit 209. The number of components (N) of the separated frequency domain signal for each user is equal to or less than the number of output components ($N_{DFT}$), of a DFT unit 223 used in the transmission apparatus, and therefore, zero is inserted into the same frequency component as the signal clipped on the transmission side in a first zero insertion unit 213 based on clipping information 2001 given from a clipping control unit 211. This is an operation to attach zero to both ends or one end of the output signal of the subcarrier demapping unit 209 and by this operation, the frequency signal having the same size as the number of output components ($N_{DFT}$) of the DFT used on the transmission side is output from the first zero insertion unit 213. Here, the clipping information 2001 given from the clipping control unit 211 may be information determined in the transmission apparatus and notified as control information, or information determined by the reception apparatus.

A pilot signal for channel estimation is input into a channel estimation unit 215, which calculates a channel estimation value using the input pilot signal. Into the position of a clipped spectrum of the calculated channel estimation value, zero is inserted in a second zero insertion unit 217 based on the clipping information 2001 given from the clipping control unit 211. The zero-inserted channel estimation value is output to a channel multiplication unit 219 and an equalization unit 221. The channel multiplication unit 219 multiplies the frequency domain signal output from the DFT unit 223 by the zero-inserted channel estimation value input from the second zero insertion unit 217 and outputs the obtained signal to a cancel unit 225.

In the cancel unit 225, the frequency domain signal given from the channel multiplication unit 219 is subtracted from the frequency domain signal given from the first zero insertion unit 213, and thereby the replica of a desired signal is cancelled and residual signal components are calculated. However, in the first processing in the cancel unit 225, the signal replica is not generated, and therefore, cancel processing is not performed and the frequency domain signal given from the first zero insertion unit 213 is output to the equalization unit 221 as it is. The equalization unit 221 performs equalization processing using the output of the cancel unit 225 and the channel estimation value, which is the output of the second zero insertion unit 217, and then restores the desired signal using the signal replica, which is the output of a replica generation unit 227, after conversion into the time domain is performed by the IDFT (Inverse DFT).

Here, into the channel estimation value used in equalization processing, zero is inserted in the second zero insertion unit 217, and therefore, the reception apparatus performs equalization by handling the spectrum clipped in the transmission apparatus as if it is lost by the fall of the channel. Such processing makes it possible to correctly reproduce the signal before being clipped in the transmission apparatus.

After that, the signal output from the equalization unit 221 is demodulated in a demodulation unit 229 and subsequently, is error corrected in a decoding unit 231 and an LLR (Log Likelihood Ratio) of a coded bit is calculated. Iteration of equalization processing is determined based on the LLR in an iteration control unit 233 and in the case where processing is repeated, the LLR is output to the replica generation unit 227 in order to generate a soft replica of the signal and in the case where the iteration processing is exited, the LLR is output to a determination unit 235. The replica generation unit 227 generates a soft replica in accordance with reliability of the LLR of the coded bit. The generated replica is input to the DFT unit 223 and then input to the channel multiplication unit 219 described previously. Further, the replica generation unit 227 outputs the generated replica to the equalization unit 221 for reconfiguration of the desired signal at the time of equalization.

Such equalization processing is repeated a plurality of times based on the number of times of iteration determined by the iteration control unit 233, and finally the decoded bit is obtained by performing hard decision on the LLR of the information bit sequence in the determination unit 235.

PRIOR ART DOCUMENT

Non-Patent Document

Non-Patent Document 1: A. Okada, S. Ibi, S. Sampei, "Spectrum Shaping Technique Combined with SC/MMSE Turbo Equalizer for High Spectral Efficient Broadband Wireless Access Systems," ICSPCS2007, Gold Coast, Australia, December 2007.

DISCLOSURE OF THE INVENTION

Summary of the Invention

When transmission is performed using the previously described Clipped DFT-S-OFDM and clipping of a spectrum is performed in the transmission apparatus, it is necessary for the reception apparatus to regard the frequency at the position of the spectrum not transmitted as a channel whose gain is zero, and therefore, it is necessary to mutually share information of the position of the clipped spectrum. No means for sharing is clearly described in the past documents, but, as simple means, mention is made of a method for providing notification of clipping information used in actual transmission by the transmission apparatus or the reception apparatus using control information, similar to coding rate information, modulation scheme information, etc. However, there has been a problem that notification of information on clipping in each transmission chance leads to an increase in the amount of control information and eventually leading to reduction in throughput of data transmission.

The present invention has been made in view of such circumstances and aims at providing a wireless transmission apparatus, a wireless reception apparatus, a wireless communication system, and a control program and an integrated circuit of the wireless transmission apparatus, wherein it is not necessary for a reception apparatus or a transmission apparatus to notify the transmission apparatus or the reception apparatus of information on clipping in the wireless communication system in which clipping is performed.

Means for Solving the Problems (1) In order to achieve the above-mentioned object, the present invention has taken the following measure. That is, the wireless transmission apparatus of the present invention is a wireless transmission apparatus that performs clipping processing not to transmit a spectrum of part of a frequency domain signal when transmitting data to a wireless reception apparatus, wherein the wireless transmission apparatus uses information which is notified from the wireless reception apparatus other than information which directly specifies a frequency band to be subjected to the clipping processing to determine the frequency band to be subjected to the clipping processing.

As described above, the wireless transmission apparatus determines a frequency band to be subjected to clipping processing using information other than information directly specifying a frequency band to be subjected to clipping processing, and therefore, information directly identifying a frequency to be subjected to clipping processing is no longer necessary. As a result of that, it is made possible to improve throughput of data transmission by suppressing an increase in the amount of control information.

(2) Further, the wireless transmission apparatus of the present invention is characterized in that the information used when determining a frequency band to be subjected to the clipping processing is at least one piece of information included in control information notified from the reception apparatus.

As described above, the information used when determining a frequency band to be subjected to clipping processing is at least one piece of information included in control information notified from the reception apparatus, and therefore, the information directly identifying a frequency to be subjected to clipping processing is no longer necessary. As a result of that, it is made possible to improve throughput of data transmission by suppressing an increase in the amount of control information.

(3) Further, the wireless transmission apparatus of the present invention is characterized in that the at least one piece of the notified control information is information indicative of a bandwidth of an allocated radio resource.

As described above, the at least one piece of the notified control information is information indicative of a bandwidth of an allocated radio resource, and therefore, it is possible for the wireless transmission apparatus to perform processing necessary for clipping without notification of information on clipping between a transmission apparatus and a reception apparatus. As a result of that, it is made possible to reduce the amount of control information and to achieve a reduction in the burden of implementing the clipping technique.

(4) Further, the wireless transmission apparatus of the present invention is characterized in that the frequency band to be subjected to the clipping processing is determined based on a table in which an allocated radio resource bandwidth and a frequency bandwidth to be subjected to the clipping processing are associated with each other.

As described above, the wireless transmission apparatus determines a frequency band to be subjected to clipping processing based on a table in which an allocated radio resource bandwidth and a frequency bandwidth to be subjected to clipping processing are associated with each other, and therefore, it is possible to perform processing necessary for clipping without notification of information on clipping between a transmission apparatus and a reception apparatus. As a result of that, it is made possible to reduce the amount of control information and to achieve a reduction in the burden of implementing the clipping technique.

(5) Further, the wireless transmission apparatus of the present invention is characterized in that the frequency band to be subjected to the clipping processing is determined based on a clipping rate determined in advance between the wireless reception apparatus and the wireless transmission apparatus.

As described above, the wireless transmission apparatus determines a frequency band to be subjected to clipping processing based on a clipping rate determined in advance between the wireless reception apparatus and the wireless transmission apparatus, and therefore, it is possible to perform clipping processing in accordance with a parameter with which to change the clipping rate.

(6) Further, the wireless transmission apparatus of the present invention is characterized in that in a case where the clipping processing is performed in allocation units of an allocated radio resource, when $N_R$ denotes a number of allocation units of an allocated radio resource, $R_{CLIP}$ denotes a clipping rate determined in advance between the wireless reception apparatus and the wireless transmission apparatus, and floor (x) denotes a function expressing a maximum integer equal to or less than a real number x with respect to x, a number of clippings $N_{CLIP}$ corresponding to the number of allocation units to be subjected to the clipping processing is determined using a formula below.

$$N_{CLIP} = \text{floor}(R_{CLIP} \cdot N_R) \quad \text{[Formula 1]}$$

As described above, the wireless transmission apparatus determines the number of clippings $N_{CLIP}$ corresponding to the number of allocation units to be subjected to clipping processing using the above formula, and therefore, it is possible to perform clipping processing in accordance with a parameter with which to change the clipping rate.

(7) Further, the wireless transmission apparatus of the present invention is characterized in that in a case where the clipping processing is performed after a time domain signal is converted into a frequency domain signal, a DFT (Discrete Fourier Transform) size of the frequency domain signal is determined based on an allocated radio resource bandwidth and a frequency bandwidth to be subjected to the clipping processing.

As described above, in the case where clipping processing is performed after a time domain signal is converted into a frequency domain signal, the wireless transmission apparatus determines the DFT (Discrete Fourier Transform) size of the frequency domain signal based on an allocated radio resource bandwidth and a frequency bandwidth to be subjected to clipping processing, and therefore, it is made possible to perform clipping processing based on a definition determined in common to the transmission apparatus and the reception apparatus by regarding allocation resource number information already known to both the transmission apparatus and the reception apparatus as a radio resource available after clipping. As a result of that, it is possible to increase the transmission rate and perform clipping processing without increasing the amount of control information compared to that in the case where clipping is not performed.

(8) Further, the wireless transmission apparatus of the present invention is characterized in that the DFT (Discrete Fourier Transform) size of the frequency domain signal is determined based on a table in which an allocated radio resource bandwidth and a frequency bandwidth to be subjected to the clipping processing are associated with each other.

As described above, the wireless transmission apparatus determines the DFT (Discrete Fourier Transform) size of the frequency domain signal based on a table in which an allocated radio resource bandwidth and a frequency bandwidth to be subjected to clipping processing are associated with each other, and therefore, it is made possible to perform clipping processing based on a definition determined in common to the transmission apparatus and the reception apparatus by regarding the allocation resource number information already known to both the transmission apparatus and the reception apparatus as a radio resource available after clipping. As a result of that, it is possible to increase the transmission rate and perform clipping processing without increasing the amount of control information compared to that in the case where clipping is not performed.

(9) Further, the wireless transmission apparatus of the present invention is characterized in that in a case where clipping processing is performed in allocation units of an allocated radio resource, when $N_R$ denotes a number of allocation units of an allocated radio resource, $R_{CLIP}$ denotes a clipping rate determined in advance between the wireless reception apparatus and the wireless transmission apparatus, and X denotes a set of natural numbers whose prime factors are expressed only by 2, 3, and 5, the DFT size $N_{DFT}$ is determined using a formula below.

[Formula 2]

$$N_{DFT} = \max_{x \in X}\left\{x < \left(\frac{1}{1-R_{CLIP}} \cdot N_R\right)\right\}$$

As described above, the DFT size $N_{DFT}$ is determined using the above formula, and therefore, it is possible to perform clipping processing in accordance with a parameter with which to change the clipping rate.

(10) Further, the wireless transmission apparatus of the present invention is characterized in that the at least one piece of the notified control information is an MCS (Modulation and Coding Scheme) to be applied in transmission to the wireless reception apparatus.

As described above, at least one piece of notified control information is an MCS (Modulation and Coding Scheme) to be applied to transmission to the wireless reception apparatus, and therefore, it is made possible to perform clipping processing in accordance with the optimum clipping rate that changes depending on the MCS. Further, by performing clipping based on MCS information and allocation resource number information already known to each of the transmission apparatus and the reception apparatus, it is possible to prevent an increase in the amount of control information due to clipping information.

(11) Further, the wireless transmission apparatus of the present invention is characterized in that in a case where the clipping processing is performed in allocation units of an allocated radio resource, when $N_R$ denotes a number of allocation units of an allocated radio resource, $R_{CLIP3}$ denotes a clipping rate determined in advance between the wireless reception apparatus and the wireless transmission apparatus, a clipping rate when a coding rate is P and a modulation scheme is Q denotes $R_{CLIP3}$ (P, Q), and floor (x) denotes a function expressing a maximum integer equal to or less than a real number x with respect to x, a number of clippings $N_{CLIP3}$ corresponding to the number of allocation units to be subjected to the clipping processing is determined using a formula below.

$$N_{CLIP3} = \text{floor}(R_{CLIP3}(P,Q) \cdot N_R) \quad \text{[Formula 3]}$$

As described above, the wireless transmission apparatus determines the number of clippings 1 corresponding to the number of allocation units to be subjected to clipping processing using the above formula, and therefore, it is possible to perform clipping processing in accordance with a parameter with which to change the clipping rate.

(12) further, the wireless transmission apparatus of the present invention is characterized in that in a case where the clipping processing is performed in allocation units of an allocated radio resource, when $N_R$ denotes a number of allocation units of an allocated radio resource, a clipping rate when a coding rate is P and a modulation scheme is Q denotes $R_{CLIP}$ (P, Q), and X denotes a set of natural numbers whose prime factors are expressed only by 2, 3, and 5, the DFT size $N_{DFT}$ is determined using a formula below.

[Formula 4]

$$N_{DFT} = \max_{x \in X}\left\{x < \left(\frac{1}{1-R_{CLIP}(P,Q)} \cdot N_R\right)\right\}$$

As described above, the wireless transmission apparatus determines the DFT size $N_{DFT}$ using the above formula, and therefore, it is possible to perform clipping processing in accordance with a parameter with which to change the clipping rate.

(13) Further, the wireless transmission apparatus of the present invention is characterized in that the at least one piece of the notified control information is information indicative of a rank applied in transmission to the wireless reception apparatus.

As described above, the at least one piece of the notified control information is information indicative of a rank to be applied to transmission to the wireless reception apparatus, and therefore, it is made possible to perform clipping processing in correspondence to the optimum clipping rate that changes depending on the rank of MIMO communication. Further, by performing clipping based on rank information and allocation resource number information already known to each of the transmission apparatus and the reception apparatus, it is possible to prevent an increase in the amount of control information due to clipping information.

(14) Further, the wireless transmission apparatus of the present invention is characterized in that in a case where the clipping processing is performed in allocation units of an allocated radio resource, when $N_R$ denotes a number of allocation units of an allocated radio resource, a clipping rate when a rank is L denotes $R_{CLIP4}$ (L), and floor (x) denotes a function expressing a maximum integer equal to or less than a real number x with respect to x, a number of clippings $N_{CLIP4}$ corresponding to the number of allocation units to be subjected to the clipping processing is determined using a formula below.

$$N_{CLIP4} = \text{floor}(R_{CLIP}(L) \cdot N_R) \quad \text{[Formula 5]}$$

As described above, the wireless transmission apparatus determines the number of clippings $N_{CLIP4}$ corresponding to the number of allocation units to be subjected to clipping processing using the above formula, and therefore, it is possible to perform clipping processing in accordance with a parameter with which to change the clipping rate.

(15) Further, the wireless transmission apparatus of the present invention is characterized in that in a case where the clipping processing is performed in allocation units of an allocated radio resource, when $N_R$ denotes a number of allocation units of an allocated radio resource, a clipping rate when a rank is L denotes $R_{CLIP}$ (L), and X denotes a set of natural numbers whose prime factors are expressed only by 2, 3, and 5, the DFT size $N_{DFT}$ is determined using a formula below.

[Formula 6]

$$N_{DFT} = \max_{x \in X}\left\{x < \left(\frac{1}{1-R_{CLIP}(L)} \cdot N_R\right)\right\}$$

As described above, the DFT size $N_{DFT}$ is determined using the above formula, and therefore, it is possible to perform clipping processing in accordance with a parameter with which to change the clipping rate.

(16) Further, the wireless reception apparatus of the present invention is a wireless reception apparatus that receives data having been subjected to clipping processing not to transmit a spectrum of part of a frequency domain signal on a transmission side and transmitted, wherein the wireless reception apparatus determines a frequency band to be subjected to clipping processing based on control information notified to a transmission apparatus and a radio resource clipping frequency position determination rule already known to a reception side.

As described above, the wireless reception apparatus determines a frequency band to be subjected to clipping processing based on control information notified to the transmission apparatus and the radio resource clipping frequency position determination rule already known to the reception side, and therefore, information directly identifying a frequency to be subjected to clipping processing is no longer necessary. As a result of that, it is made possible to improve throughput of data transmission by suppressing an increase in the amount of control information.

(17) Further, the wireless communication system of the present invention is characterized by being configured by the wireless transmission apparatus described in any of (1) to (15) described above, and the wireless reception apparatus.

As described above, the wireless communication system is configured by the wireless transmission apparatus described in any of (1) to (15) described above, and the wireless reception apparatus, and therefore, information directly identifying a frequency to be subjected to clipping processing is no longer necessary. As a result of that, it is made possible to improve throughput of data transmission by suppressing an increase in the amount of control information.

(18) Further, the control program of the wireless transmission apparatus of the present invention is characterized by converting a series of processing into commands so as to enable a computer to read and execute them, the series of processing including: clipping processing not to transmit a spectrum of part of a frequency domain signal when transmitting data to a wireless reception apparatus; and processing to determine a frequency band to be subjected to the clipping processing using information which is notified from the wireless reception apparatus other than information which directly specifies a frequency band to be subjected to the clipping processing.

As described above, the wireless transmission apparatus determines a frequency band to be subjected to clipping processing using information other than information directly specifying a frequency band to be subjected to clipping processing, and therefore, information directly identifying a frequency to be subjected to clipping processing is no longer necessary. As a result of that, it is made possible to improve throughput of data transmission by suppressing an increase in the amount of control information.

(19) Further, the integrated circuit of the present invention is an integrated circuit that is implemented in a wireless transmission apparatus thereby causing the wireless transmission apparatus to exhibit a plurality of functions, the integrated circuit causing the wireless transmission apparatus to exhibit a plurality of functions of: transmitting data to a wireless reception apparatus; performing clipping processing not to transmit a spectrum of part of a frequency domain signal; and determining a frequency band to be subjected to the clipping processing using information which is notified from the wireless reception apparatus other than information which directly specifies a frequency band to be subjected to the clipping processing.

As described above, the integrated circuit has the function to determine a frequency band to be subjected to clipping processing using information other than information directly specifying a frequency band to be subjected to clipping processing, and therefore, information directly specifying a frequency band to be subjected to clipping processing is no longer necessary. As a result of that, it is made possible to improve throughput of data transmission by suppressing an increase in the amount of control information.

Effect of the Invention

Use of the present invention makes it possible to share information on clipping without the need to transmit the information between a transmission apparatus and a reception apparatus in a wireless communication system, and therefore, it is made possible to implement the clipping technique without increasing the burden to the amount of control information.

BRIEF DESCRIPTION OF THE DRAWINGS

FIG. 3 is a table showing an example of a clipping number determination method according to the first embodiment of the present invention.

FIG. 7 is a table showing an example of a clipping number and DFT size determination method according to the second embodiment of the present invention.

FIG. 11 is a table showing an example of clipping number determination means in a clipping control unit 115c and a clipping control unit 211c of the transmission apparatus and the reception apparatus of the third embodiment of the present invention.

FIG. 14 is a table showing an example of clipping number determination means in a clipping control unit 115d and the clipping control unit 211c of the transmission apparatus and the reception apparatus of the third embodiment of the present invention.

FIG. 17 is a table showing an example of clipping number determination means in a clipping control unit 115e and a clipping control unit 211d of the transmission apparatus and the reception apparatus of the fourth embodiment of the present invention.

FIG. 18 is a table for explaining an example of clipping information generation according to the fourth embodiment of the present invention.

BEST MODES FOR CARRYING OUT THE INVENTION

Hereinafter, embodiments of the present invention are explained with reference to the drawings. In the following embodiments, uplink communication is dealt with, but, even if the same method is used in a downlink, the embodiment is essentially the same as the present invention. That is, mapping information or control information, such as an MCS, to be input when determining clipping information may be generated in any of a transmission apparatus and a reception apparatus, or may be notified from a transmission apparatus to a reception apparatus. Further, in the explanation of the following embodiments, as an allocation unit of the number of allocated resources, an RB (Resource Block) is used, but, even if a different allocation unit is used, the effects of the present invention are the same.

First Embodiment

Number of Clippings is Determined in Accordance with Number of Allocated RBs

In the present embodiment, a number of radio resources to be clipped is determined based on a number of allocated radio resources, which is information already known to a transmission apparatus and a reception apparatus and a clipping position is identified by each of the transmission apparatus and the reception apparatus.

Figure 1:
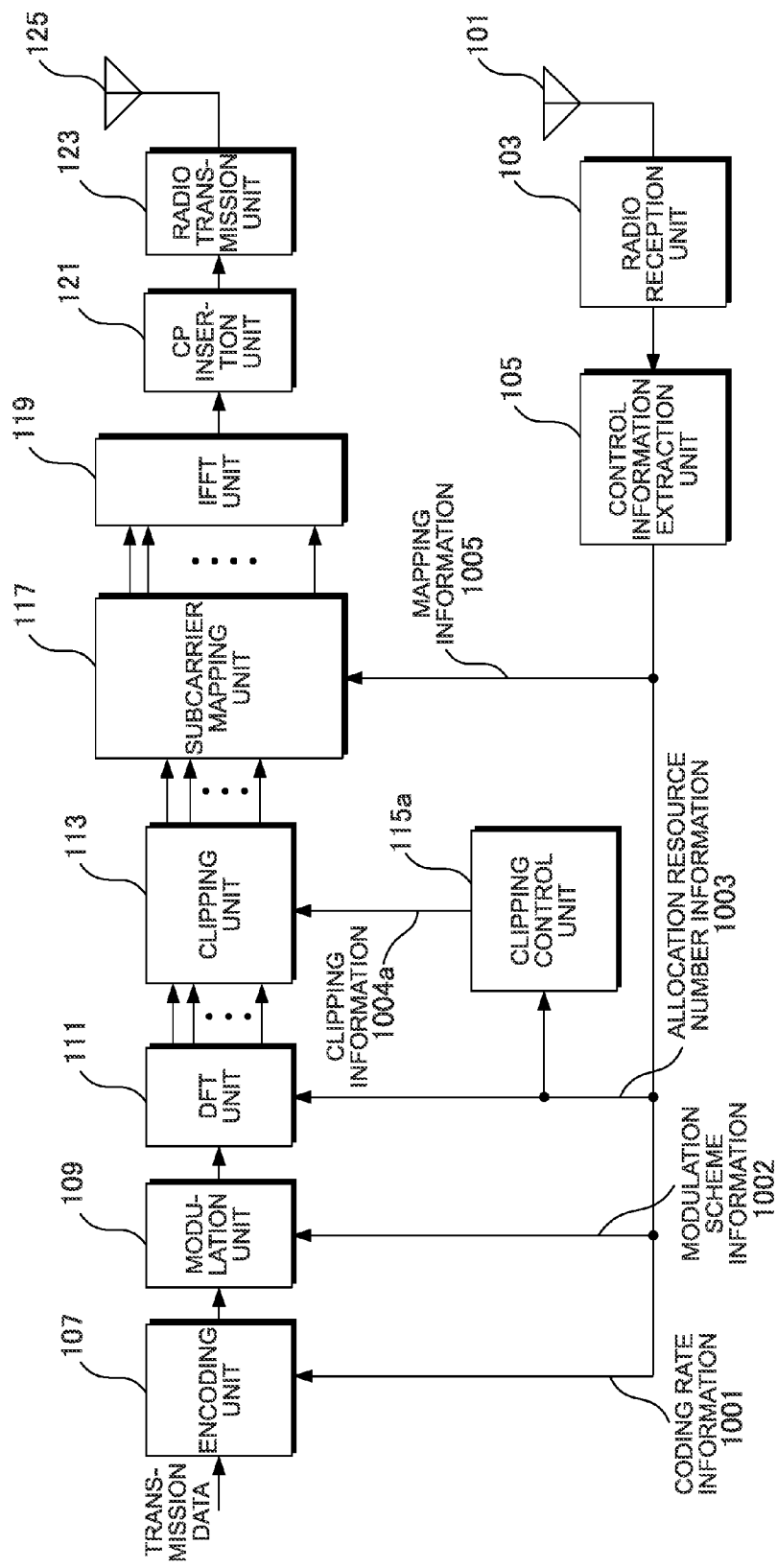
FIG. 1 is a block diagram showing an example of a wireless transmission apparatus configuration according to a first embodiment of the present invention.
Figure 19:
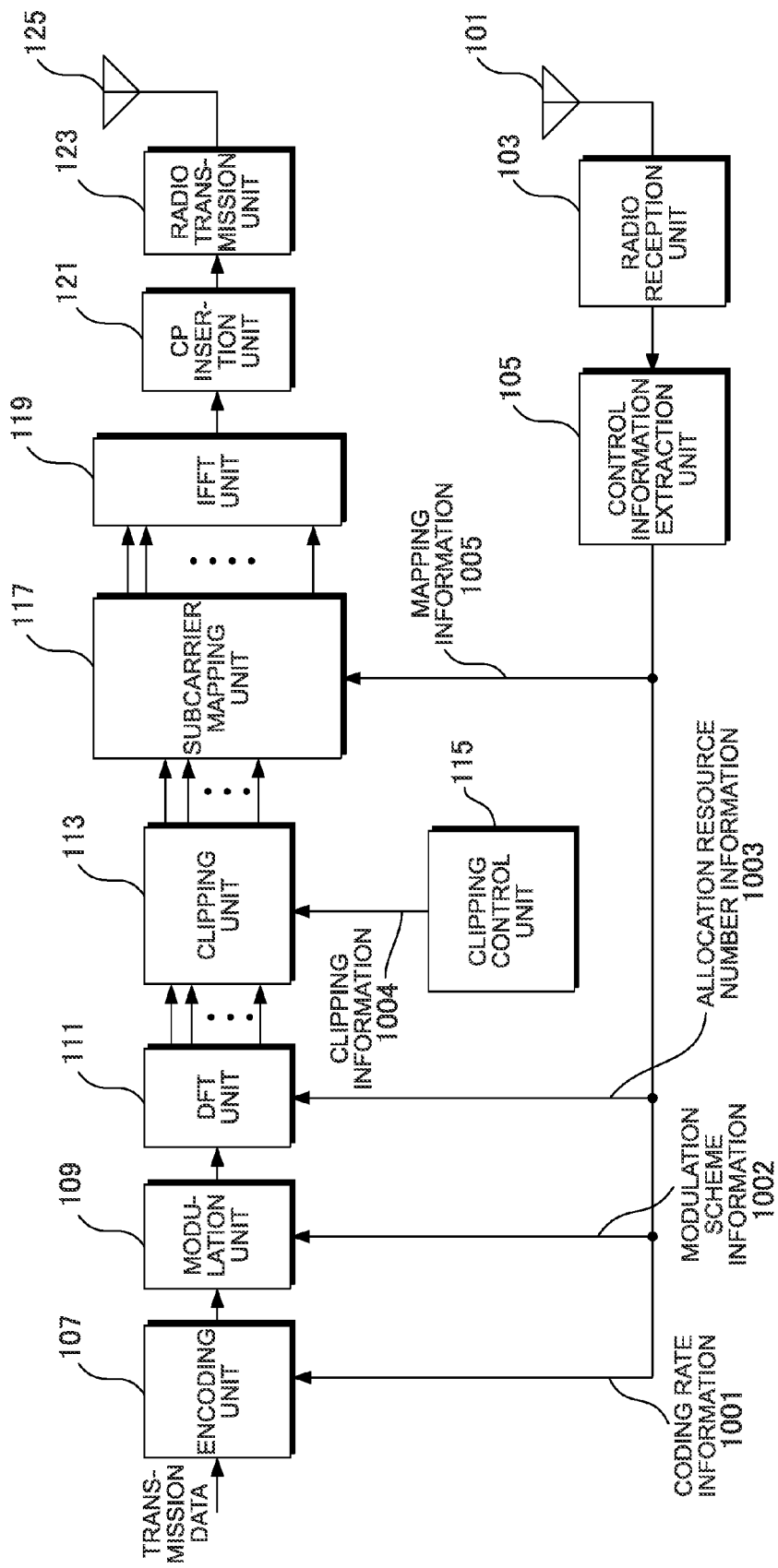
FIG. 19 is a block diagram showing a configuration example of a transmission apparatus in the case where Clipped DFT-S-OFDM is used in uplink transmission.

FIG. 1 is a block diagram showing an example of a wireless transmission apparatus configuration according to the first embodiment of the present invention. The transmission apparatus of the present embodiment differs from a transmission apparatus shown in FIG. 19 in that a clipping control unit 115 is replaced with a clipping control unit 115a and parts to which the same symbols as those in FIG. 19 are attached have the same function as those of the transmission apparatus described in FIG. 19, and therefore, explanation thereof is omitted here. It is designed so that allocation resource number information 1003 output from a control information extraction unit 105 can be input to the clipping control unit 115a, which determines a number of clippings $N_{CLIP}$ based on a number of an allocated resources $N_R$ given from the input allocation resource number information 1003 (determination method will be described later). Further, which position of the $N_R$ allocated resources is clipped is determined using predetermined clipping position determination means and it is output to a clipping unit 113 as clipping information 1004a.

Figure 2:
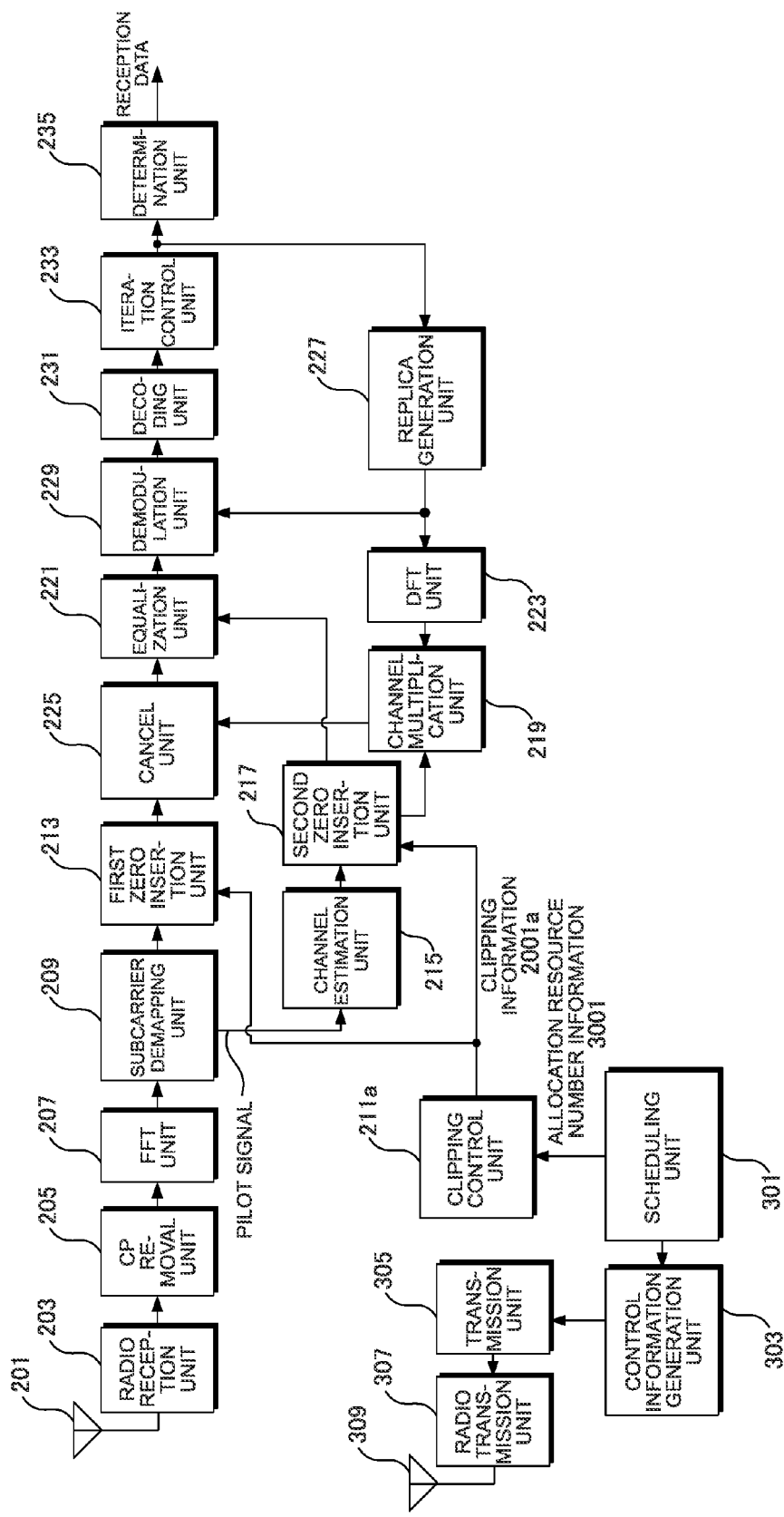
FIG. 2 is a block diagram showing an example of a wireless reception apparatus configuration according to the first embodiment of the present invention.
Figure 20:
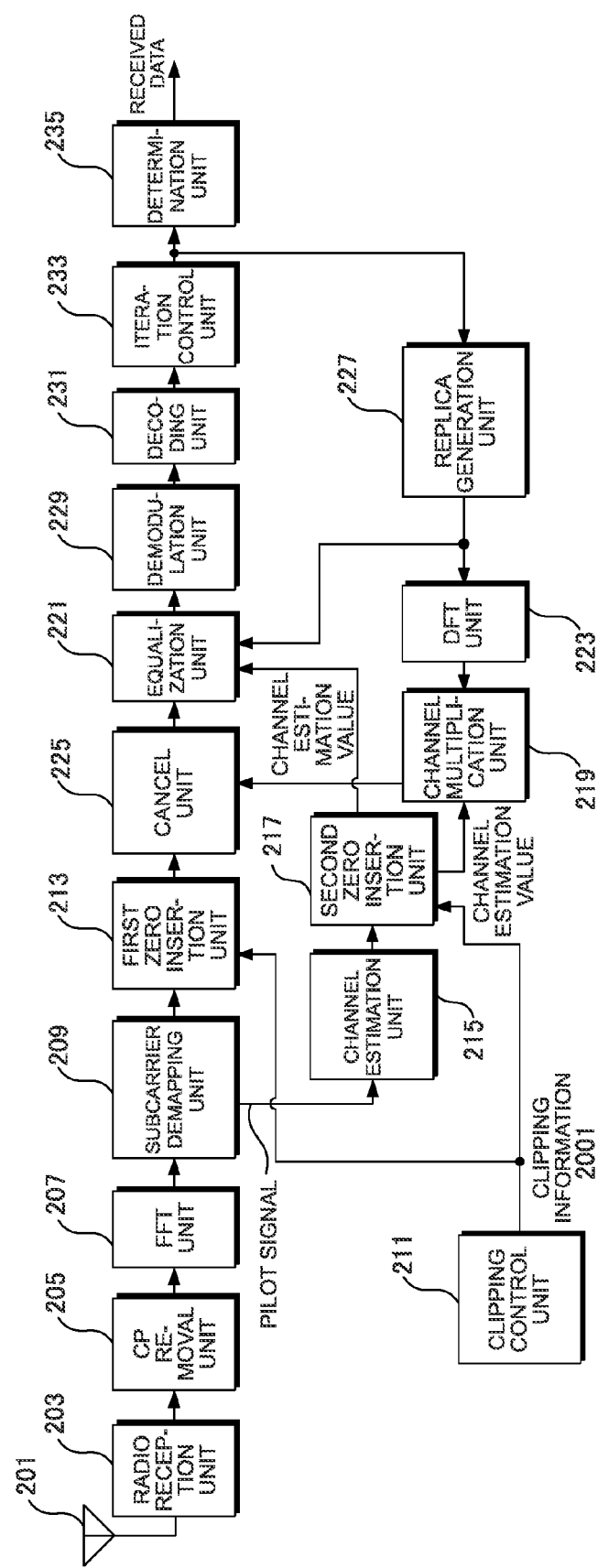
FIG. 20 is a block diagram showing a configuration example of a reception apparatus using frequency domain SC/MMSE turbo equalization.

FIG. 2 is a block diagram showing an example of a wireless reception apparatus configuration according to the first embodiment of the present invention. The reception apparatus of the present embodiment differs from a reception apparatus shown in FIG. 20 in that a clipping control unit 211 is replaced with a clipping control unit 211a. The clipping control unit 211a receives allocation resource number information 3001 from a scheduling unit 301, determines a number of clippings and a clipping position by the same processing of the clipping control unit 115a in the radio apparatus described previously, and outputs the number and position as clipping information 2001a. The output clipping information 2001a is input to a first zero insertion unit 213 and a second zero insertion unit 217, and zero is inserted into the clipping position in a demapped received signal and channel estimation value.

Here, in the clipping processing of the same transmission chance, the allocation resource number information 1003 in FIG. 1 and the allocation resource number information 3001 in FIG. 2 are the same information, and therefore, the clipping information 1004a in the transmission apparatus in FIG. 1 and the clipping information 2001a in FIG. 2 obtained by performing the common processing will also be the same information. Consequently, it is made possible to share the clipping information between the apparatuses without the need to newly add information on clipping to the control information.

FIG. 3 is a table showing an example of a clipping number determination method according to the first embodiment of the present invention. In one of clipping number determination methods, a correspondence table as shown in FIG. 3, which defines the number of clippings corresponding to the number of allocated resources, is provided in the clipping control unit 115a and the clipping control unit 211a of the transmission apparatus and the reception apparatus, and the number of clippings is identified based on the allocation resource number information input to each. In the table shown in FIG. 3, when $N_R$ is 1 to 2 RBs, $N_{CLIP}$ is 0 RBs, and therefore, clipping is not performed. When $N_R$ is 3 to 5 RBs, $N_{CLIP}$ is 1 RB and similarly, when $N_R$ is 6 to 8 RBs, $N_{CLIP}$ is 2 RBs, when $N_R$ is 9 to 12 RBs, $N_{CLIP}$ is 3 RBs, when $N_R$ is 13 to 16 RBs, $N_{CLIP}$ is 4 RBs, and when $N_R$ is 17 to 20 RBs, $N_{CLIP}$ is determined to be 5 RBs. Here, $N_R$ and $N_{CLIP}$ are not necessarily required to be in a proportional relationship and any relationship may be set.

Further, when the ratio of the allowable number of clippings to the number of allocated resources (clipping rate) is set constant, it may also be possible to determine $N_{CLIP}$ by a formula below instead of using the table as in FIG. 3.

[Formula 7]

$$N_{CLIP} = \text{floor}(R_{CLIP} \cdot N_R) \qquad \text{formula (1)}$$

Here, $R_{CLIP}$ is a clipping rate determined in common to the transmission apparatus and the reception apparatus and floor (x) is a function (also called a floor function) expressing a maximum integer equal to or less than a real number x with respect to x.

If it is possible to uniquely determine the number of clippings for the number of allocated resources without using the table as in FIG. 3 or the formula (1), another calculation formula may be used. However, it should be noted that in the case where such a table, a calculation formula, etc., is used in the transmission apparatus, the same determination method should be provided also in the reception apparatus.

As to the position of the radio resource to be clipped within an allocated radio resource after the number of clippings is determined, if a definition (radio resource clipping frequency position determination rule) common to the transmission apparatus and the reception apparatus is made, any position may be clipped. For example, $N_{CLIP}$ positions may be clipped in an ascending order of frequency of the $N_R$ allocated radio resources, or $N_{CLIP}$ positions may be clipped in a descending order of frequency, or $N_{CLIP}$ positions determined based on information already known to both the transmission apparatus and the reception apparatus may be clipped.

Figure 4:
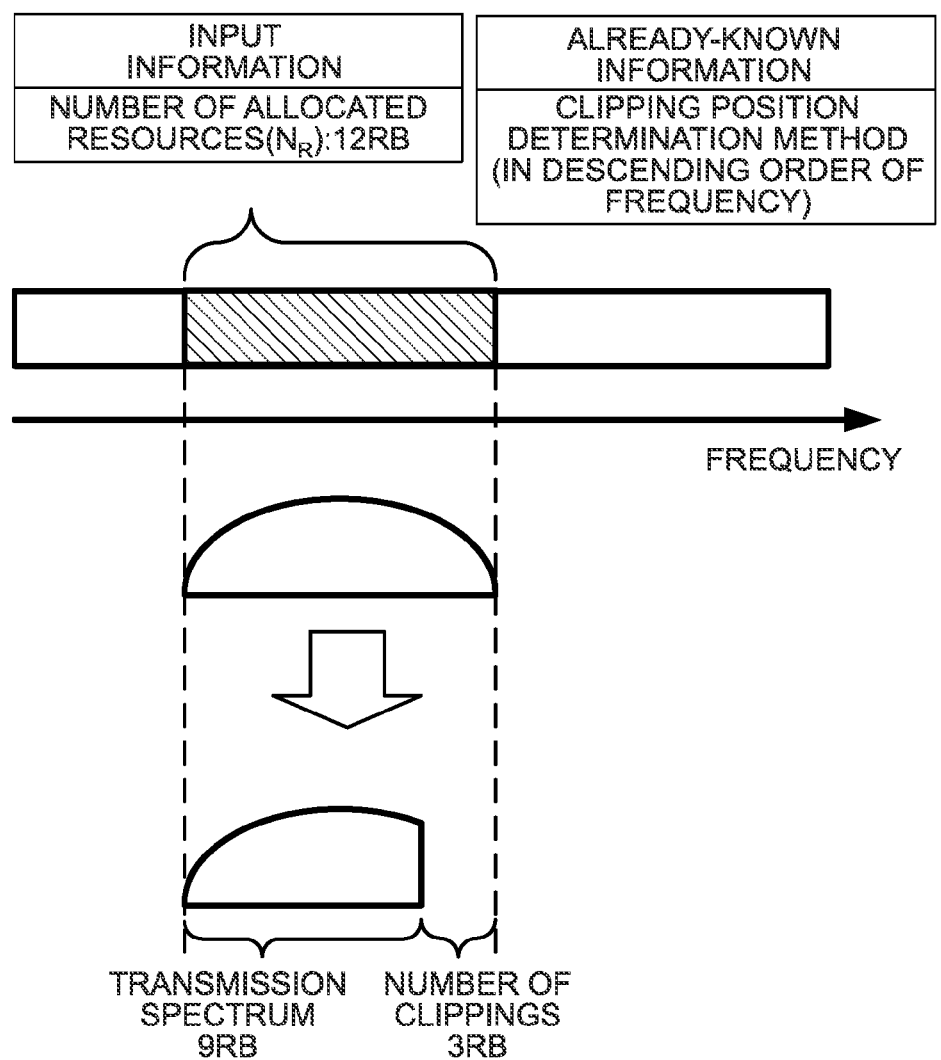
FIG. 4 is a diagram for explaining an example of clipping information generation according to the first embodiment of the present invention.

FIG. 4 is a diagram for explaining an example of clipping information generation according to the first embodiment of the present invention. In FIG. 4, in the allocation resource number information notified from the reception apparatus, 12 RBS are input as $N_R$ for the transmission apparatus. Here, it is assumed that as already-known information to be shared between the transmission apparatus and the reception apparatus, the table in FIG. 3 is set and that the setting is done so that clipping is performed in a descending order of frequency of the allocated resources. From the table in FIG. 3, the number of clippings $N_{CLIP}$ when $N_R$ is 12 is 3 RBs, and clipping information that the 3 RBs having the three highest frequencies of the allocated resources of 12 RBs are not transmitted is input to the clipping unit 113, and thus, a clipped spectrum of 9 RBs as in FIG. 4 is generated and transmitted.

On the other hand, also in the reception apparatus, the table in FIG. 3 and the information that "$N_R$=12" and "clipping in a descending order of frequency" are already known, and therefore, it is made possible to generate clipping information by the same means as in the case of the transmission apparatus described previously and zero insertion is performed in the first zero insertion unit 213 and the second zero insertion unit 217 on the assumption that 3 RBs having the three highest frequencies are clipped of the 12 RBS, which are allocated resources.

In the present embodiment, by determining the number of clippings using the allocation resource number information already known to both the transmission apparatus and the reception apparatus, it is possible to perform processing necessary for clipping without notification of information on clipping between the transmission apparatus and the reception apparatus. As a result, it is made possible to reduce the amount of control information and to achieve a reduction in the burden of implementing the clipping technique.

Second Embodiment

Mapping Information is Utilized as RB after Clipping

In the first embodiment, the transmission apparatus and the reception apparatus determine the number of clippings from the notified allocation resource number information. In the present embodiment, from notified allocation resource number information, the size (DFT size) of data to be transmitted is determined in addition to determination of the number of clippings.

Figure 5:
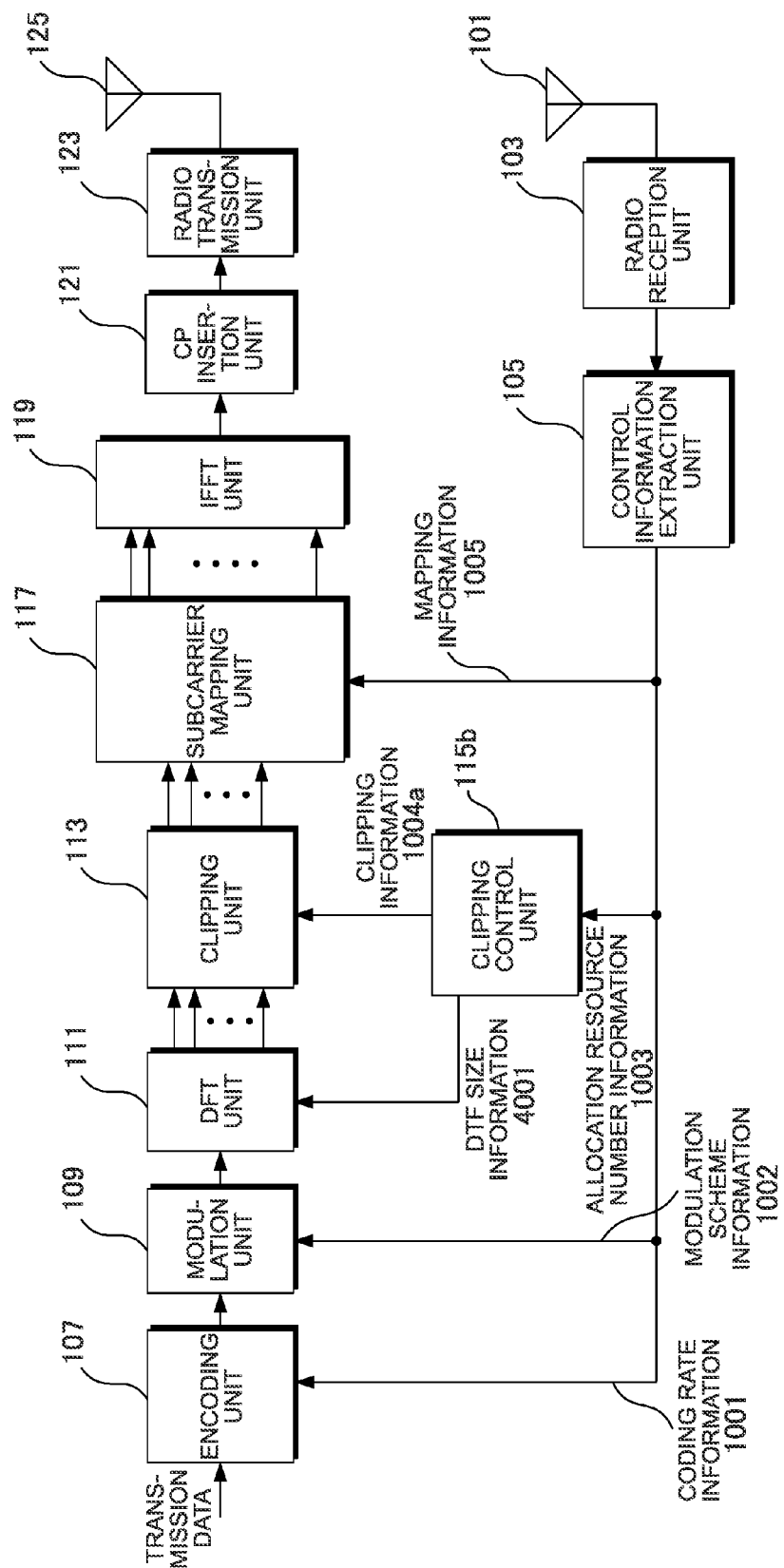
FIG. 5 is a block diagram showing an example of a wireless transmission apparatus configuration according to a second embodiment of the present invention.

FIG. 5 is a block diagram showing an example of a wireless transmission apparatus configuration according to the second embodiment of the present invention. The transmission apparatus of the present embodiment differs from the transmission apparatus shown in FIG. 1 in that the clipping control unit 115a is replaced with a clipping control unit 115b. That the clipping control unit 115b determines the number of clippings based on the allocation resource number information 1003 output from the control information extraction unit 105 is the same as in the first embodiment. The clipping control unit 115b generates clipping information 1004b based on an obtained number of clippings ($N_{CLIP2}$) and the definition on the clipping position and inputs the information to the clipping unit 113. On the other hand, in the first embodiment, the number of clippings ($N_{CLIP}$) is determined regarding the input allocation resource number information 1003 ($N_R$) as a DFT size ($N_{DFT}$) before clipping, but, in the present embodiment, $N_{CLIP2}$ and $N_{DFT}$ are determined regarding the allocation resource number information 1003 as a number of elements (output size of the clipping unit 113) after clipping. That is, the DFT size becomes "$N_{DFT}=N_R+N_{CLIP2}$" and is input to a DFT unit 111 as DFT size information 4001.

Figure 6:
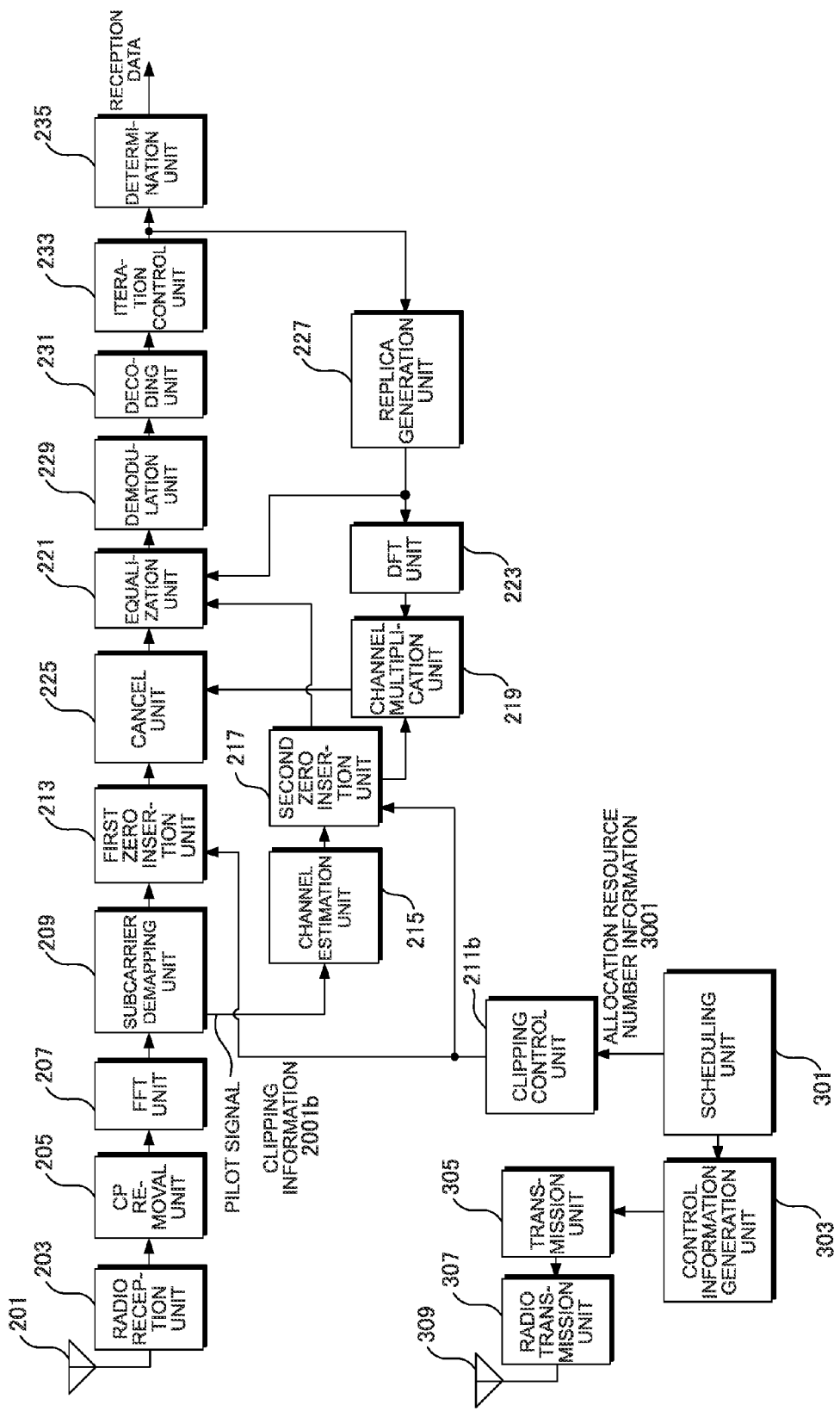
FIG. 6 is a block diagram showing an example of a wireless reception apparatus configuration according to the second embodiment of the present invention.

FIG. 6 is a block diagram showing an example of a wireless reception apparatus configuration according to the second embodiment of the present invention. The reception apparatus of the present embodiment differs from the reception apparatus shown in FIG. 2 in that the clipping control unit 211a is replaced with a clipping control unit 211b. Similar to the clipping control unit 115b in FIG. 5 in the transmission apparatus, the clipping control unit 211b regards the allocation resource number information 3001 input from the scheduling unit 301 as the number of elements after clipping. Then, by the same means as that of the transmission apparatus, the clipping control unit 211b calculates the number of clippings $N_{CLIP2}$ and outputs clipping information 2001b to the first zero insertion unit 213 and the second zero insertion unit 217 after determining the clipping position.

FIG. 7 is a table showing an example of a method for determining the number of clippings and the DFT size according to the second embodiment of the present invention. As an example of a method for determining the number of clippings $N_{CLIP2}$ and the DFT size $N_{DFT}$ of the clipping control unit 115b in FIG. 5 and the clipping control unit 211b in FIG. 6 in the second embodiment, a case where the table shown in FIG. 7 is used is explained. In FIG. 7, the input number of allocated resources ($N_R$) is associated with the number of clippings ($N_{CLIP2}$) and the DFT size ($N_{DFT}$). However, the DFT size is calculated by "$N_{DFT}=N_R+N_{CLIP2}$" and therefore, the DFT size or the number of clippings may not be specified clearly in the table. In this example, the number of clippings is defined for each number of allocated resources and as one of the factors that require such a definition, mention is made of restrictions on the DFT size. For example, in a DFT unit of the LTE system, in order to avoid an increase in the circuit scale, it is required that the number of input signals be expressed only by prime factors "2, 3, and 5", and therefore, the DFT size, such as "7", "11", or "13", is not used. For example, when the number of allocated resources is 5 in FIG. 7, if the number of clippings is set to 2 RBs, the DFT size to be calculated will be 7 and this cannot be used as described previously. Consequently, in FIG. 7, the number of clippings when the number of allocated resources is 5 is reduced to 1, and thereby the DFT size is set to 6 RBs.

Figure 8:
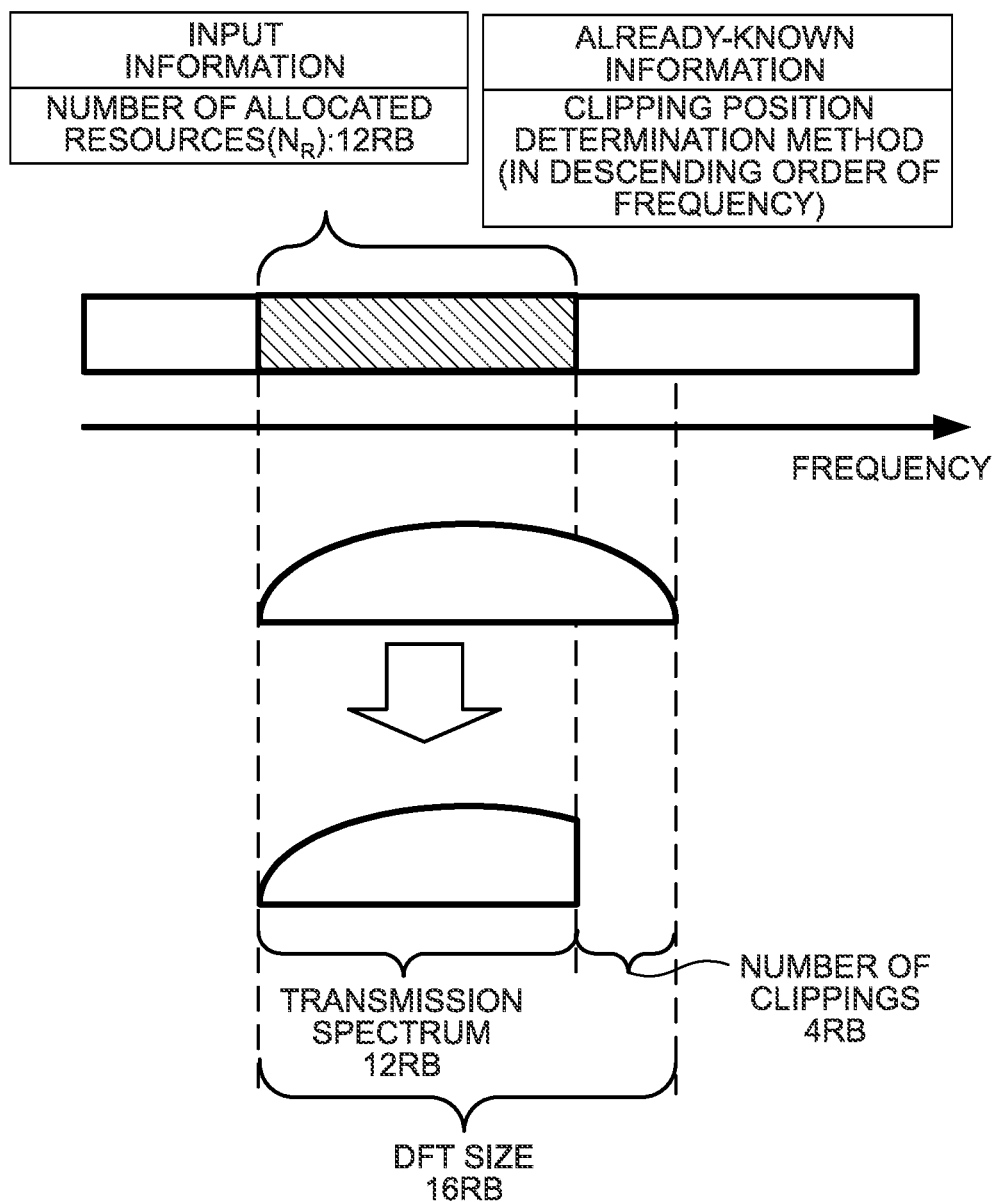
FIG. 8 is a diagram for explaining an example of clipping information generation according to the second embodiment of the present invention.

FIG. 8 is a diagram for explaining an example of clipping information generation according to the second embodiment of the present invention. In FIG. 8, an example of clipping information generation in the case where the table in FIG. 7 is used is shown. In FIG. 8, as in the case in FIG. 4 in the first embodiment, 12 RBs are allocated as $N_R$ to the transmission apparatus in the allocation resource number information notified from the reception apparatus. Further, it is assumed that the clipping positions are set in a descending order of frequency as information already known to the transmission apparatus and the reception apparatus. In FIG. 7, when $N_R$ is 12 RBs, the number of clippings is 4 RBs, and therefore, after 4 RBs are clipped, the spectrum to be transmitted will have 12 RBs. Consequently, the DFT size before clipping is 12 RBs+4 RBs=16 RBs and information that the DFT size is 16 RBs is output to the DFT unit 111, clipping information that 4 RBs having the four highest frequencies of the generated spectrum of 16 RBs are not transmitted is input to the clipping unit 113, and a clipped spectrum of 12 RBs as shown in FIG. 8 is generated and used in transmission.

On the other hand, also in the reception apparatus, the table shown in FIG. 7 and the information that "$N_R=12$" and "clipping in a descending order of frequency" are already known, and therefore, it is made possible to generate clipping information by the same means as that in the case of the transmission apparatus described previously and zero insertion is performed on the data the DFT size of which is 16 RBs in the first zero insertion unit 213 and the second zero insertion unit 217 on the assumption that the 4 RBs having the four highest frequencies are clipped.

The number of clippings $N_{CLIP2}$ and the DFT size $N_{DFT}$ may be determined by a formula etc. without using the table as described previously. For example, in the case where the allowable number of clippings is set by the fixed clipping rate $R_{CLIP}$, $N_{DFT}$ in the present embodiment may be determined by a formula below.

[Formula 8]

$$N_{DFT} = \max_{x \in X}\left\{x < \left(\frac{1}{1-R_{CLIP}} \cdot N_R\right)\right\}$$ formula (2)

Here, X is a set of natural number whose prime factors are expressed only by 2, 3, and 5. The number of clippings $N_{CLIP2}$ is calculated by a subtraction between $N_{DFT}$ obtained by the formula (2) and the number of allocated resources $N_R$.

If it is possible to uniquely determine the number of clippings and the DFT size for the number of allocated resources without using the table as in FIG. 7 or the formula (2), another calculation formula may be used. However, it should be noted that in the case where such a table, a calculation formula, etc., is used in the transmission apparatus, the same determination method should be provided also in the reception apparatus.

In the present embodiment, by regarding the allocation resource number information already known to both the transmission apparatus and the reception apparatus as the radio resource available after clipping, and based on the definition determined in common to the transmission apparatus and the reception apparatus, clipping processing is performed. As a result, it is possible to increase the transmission rate and perform clipping processing without increasing the amount of control information compared to that in the case where clipping is not performed.

Third Embodiment

Clipping Rate is Determined in Accordance with MCS

In the first embodiment and the second embodiment, the number of clippings is determined in accordance with the allocation resource number information that is notified as control information and is already known to both the transmission apparatus and the reception apparatus. In the present embodiment, an aspect is shown in which the clipping rate is determined based on an MCS which is notified as control information and which indicates the modulation scheme and the coding rate of error correction coding in order to determine the number of clippings more adaptively for transmission characteristics.

In the present embodiment, attention is focused on the fact that the reliability of nonlinear iterative equalization processing differs largely depending on the MCS used in transmission and reception in the case where signal transmission is performed by applying clipping. In order for the reception apparatus to obtain information on a spectrum (clipping spectrum) not transmitted in clipping processing, decoding of the transmitted spectrum (transmission spectrum) by error correction coding and iteration of interference cancel by a replica are necessary. At this time, the amount of information of the clipping spectrum that can be obtained depends on the reliability of the information of the transmission spectrum, that is, depends on the modulation scheme, the coding rate, etc., used in transmission. In general, the larger the number of values in the modulation scheme, and the higher the coding rate, the higher the error rate at the time of decoding becomes, and therefore, it is desirable to set the ratio of the clipping spectrum to the transmission spectrum low.

Figure 9:
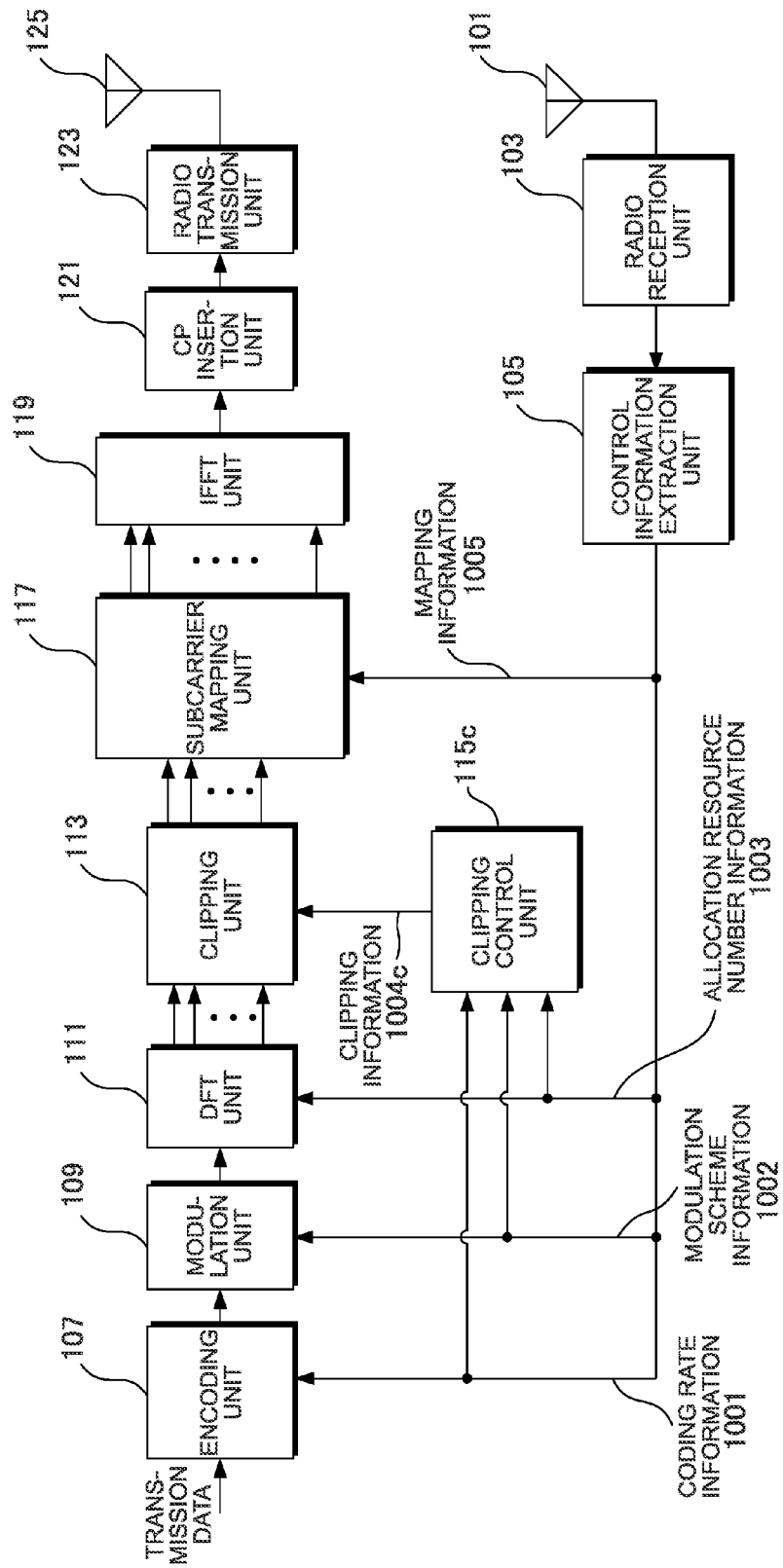
FIG. 9 is a block diagram showing an example of a wireless transmission apparatus configuration according to a third embodiment of the present invention.

FIG. 9 is a block diagram showing an example of a wireless transmission apparatus configuration according to the third embodiment of the present invention. The transmission apparatus has substantially the same components as those of the transmission apparatus in FIG. 1 in the first embodiment, but, differs in that the clipping control unit 115a is replaced with a clipping control unit 115c. To the clipping control unit 115c, in addition to the allocation resource number information 1003, coding rate information 1001 and modulation scheme information 1002 configuring the MCS are input of the control information output from the control information extraction unit 105. The clipping control unit 115c determines a number of clippings $N_{CLIP3}$ based on the coding rate information 1001, the modulation scheme information 1002, and the allocation resource number information 1003 that are input. The clipping control unit 115c generates clipping information 1004c identifying the clipping position using the calculated $N_{CLIP3}$ and the clipping position determination method determined in common to the transmission apparatus and the reception apparatus, and outputs the generated information to the clipping unit 113.

Figure 10:
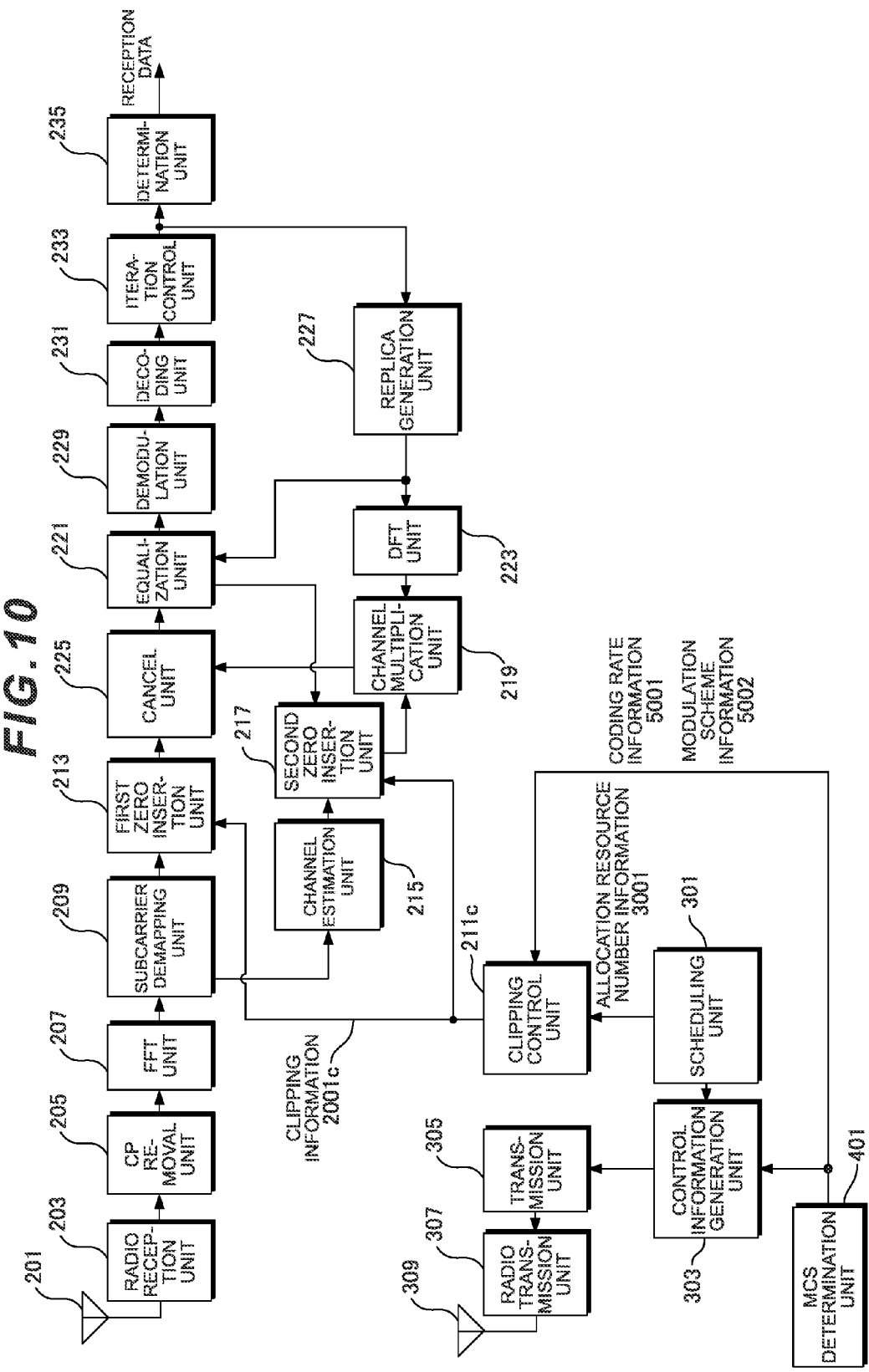
FIG. 10 is a block diagram showing an example of a wireless reception apparatus configuration according to the third embodiment of the present invention.

FIG. 10 is a block diagram showing an example of a wireless reception apparatus configuration according to the third embodiment of the present invention. The reception apparatus of the present embodiment differs from the reception apparatus shown in FIG. 2 in that the clipping control unit 211a is replaced with a clipping control unit 211c. The reception apparatus includes an MCS determination unit 401, and coding rate information 5001 and modulation scheme information 5002 are output and input to a control information generation unit 303 and the clipping control unit 211c. The clipping control unit 211c has the same clipping determination means as that of the clipping control unit 115c in FIG. 9 and determines the number of clippings based on the coding rate information 5001, the modulation scheme information 5002, and the allocation resource number information 3001 that are input.

After that, the clipping control unit 211c determines the clipping position by the same processing as that of the transmission apparatus and outputs clipping information 2001c. Here, in the clipping processing of the same transmission chance, the "allocation resource number information 3001", the "coding rate information 5001", and the "modulation scheme information 5002", and the "allocation resource number information 1003", the "coding rate information 1001", and the "modulation scheme information 1002" in FIG. 9 are the same information notified as control information, respectively, and therefore, the clipping information 2001c to be output and the clipping information 1004c in FIG. 9 will be the same information. The generated clipping information 2001c is input to the first zero insertion unit 213 and the second zero insertion unit 217 and zero is inserted into the clipping position in the demapped received signal and the channel estimation value.

FIG. 11 is a table showing an example of the clipping number determination means in the clipping control unit 115c and the clipping control unit 211c of the transmission apparatus and the reception apparatus of the third embodiment of the present invention. The clipping control unit 115c and the clipping control unit 211c have a clipping rate table as shown in FIG. 11 in which the MCS and the clipping rate are associated with each other and if the clipping rate when the modulation scheme is P and the coding rate is Q denotes $R_{CLIP3}$ (P, Q), the number of radio resources $N_{CLIP3}$ to be clipped in the clipping unit 113 is given by

[Formula 9].

$$N_{CLIP3} = \text{floor}(R_{CLIP3}(P,Q) \cdot N_R) \quad \text{formula (3)}$$

Here, it may also be possible for P and Q to be input to the clipping unit 113 as one piece of MCS information X and for $R_{CLIP3}$ to be determined by X. By calculating the number of clippings $N_{CLIP3}$ in this manner, it is possible to set the number of clippings corresponding to the MCS in each of the transmission apparatus and the reception apparatus.

Figure 12:
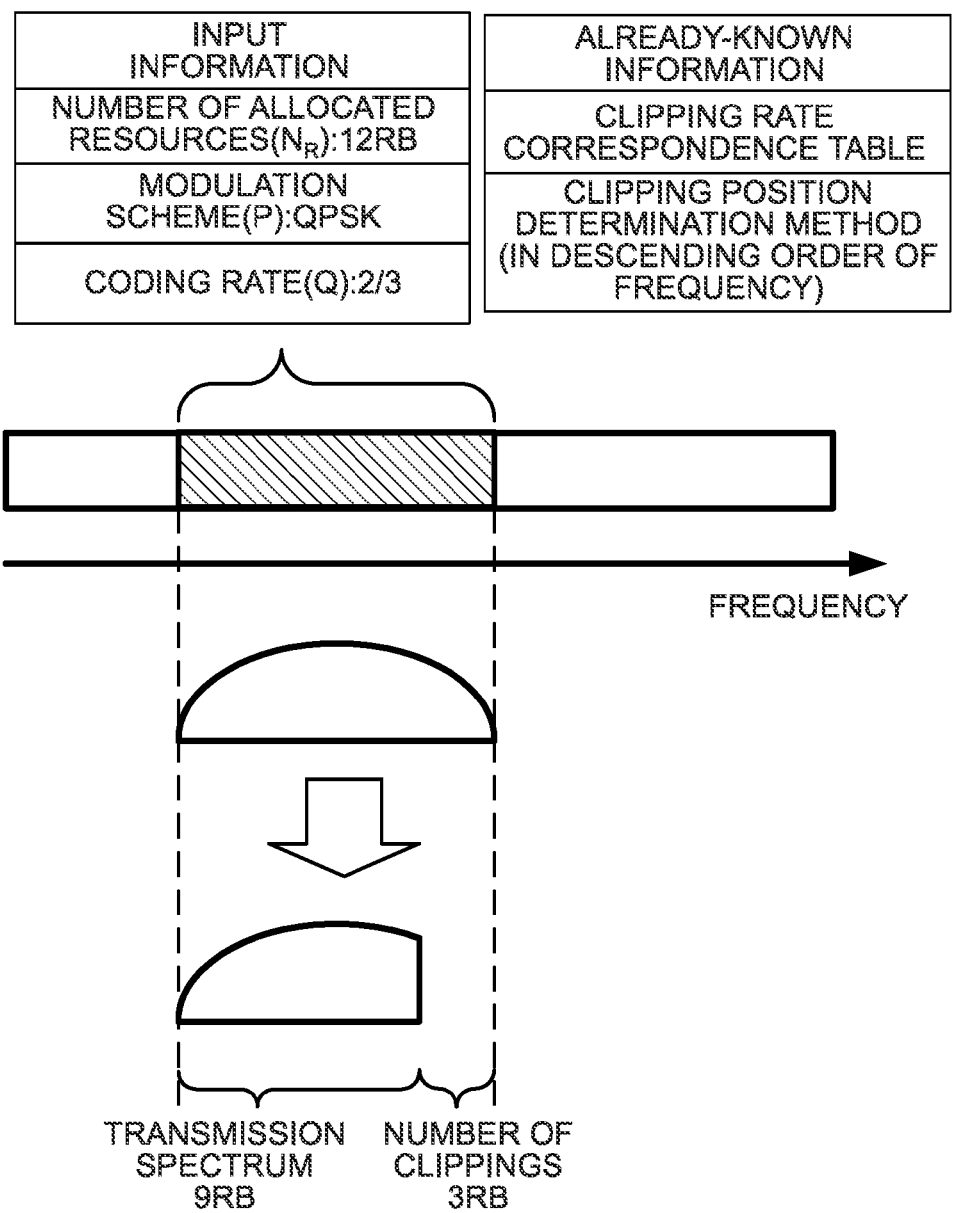
FIG. 12 is a diagram for explaining an example of clipping information generation according to the third embodiment of the present invention.

FIG. 12 is a diagram for explaining an example of clipping information generation according to the third embodiment of the present invention. In FIG. 12, as in the case in FIG. 4 in the first embodiment, in the allocation resource number information notified from the reception apparatus, 12 RBs are input as $N_R$ for the transmission apparatus and further, that the modulation scheme (P) used in transmission is QPSK and the coding rate (Q) of error correction code is 2/3 is input. It is assumed that the clipping position is set in a descending order of frequency as information already known to the transmission apparatus and the reception apparatus. The clipping rate $R_{CLIP3}$ (P, Q) is determined by the modulation scheme and the coding rate in accordance with the table shown in FIG. 11 and here, $R_{CLIP3}$=0.25 is obtained. Consequently, the number of clippings $N_{CLIP3}$ is obtained as $N_{CLIP3}$=floor (0.25×12)=3 using the formula (3) and 3 RBs are clipped, that is, the number of resource blocks to be clipped is 3. Then, clipping information that 3 RBs having the three highest frequencies of 12 RBs that are given are not transmitted is input to the clipping unit 113 and a clipped transmission spectrum of 9 RBs as in FIG. 12 is transmitted.

On the other hand, also in the reception apparatus, information that "$N_{RB}$=12", "modulation scheme: QPSK", "coding rate: 2/3", and "clipping in a descending order of frequency" is already known, and therefore, it is made possible to generate clipping information by the same means as in the case of the transmission apparatus described previously and zero insertion is performed in the first zero insertion unit 213 and the second zero insertion unit 217 on the assumption that 3 RBs having the three highest frequencies are clipped of 12 RBs, which are allocated resources.

In the configuration example described previously, the number of allocated resources is set to the DFT size ($N_{DFT}$=$N_R$) before clipping as in the first embodiment, but, also in the present embodiment, it may also be possible to set the number of allocated resources to the number of transmission spectra ($N_{DFT}$−$N_{CLIP3}$=$N_R$) after clipping as in the second embodiment.

Figure 13:
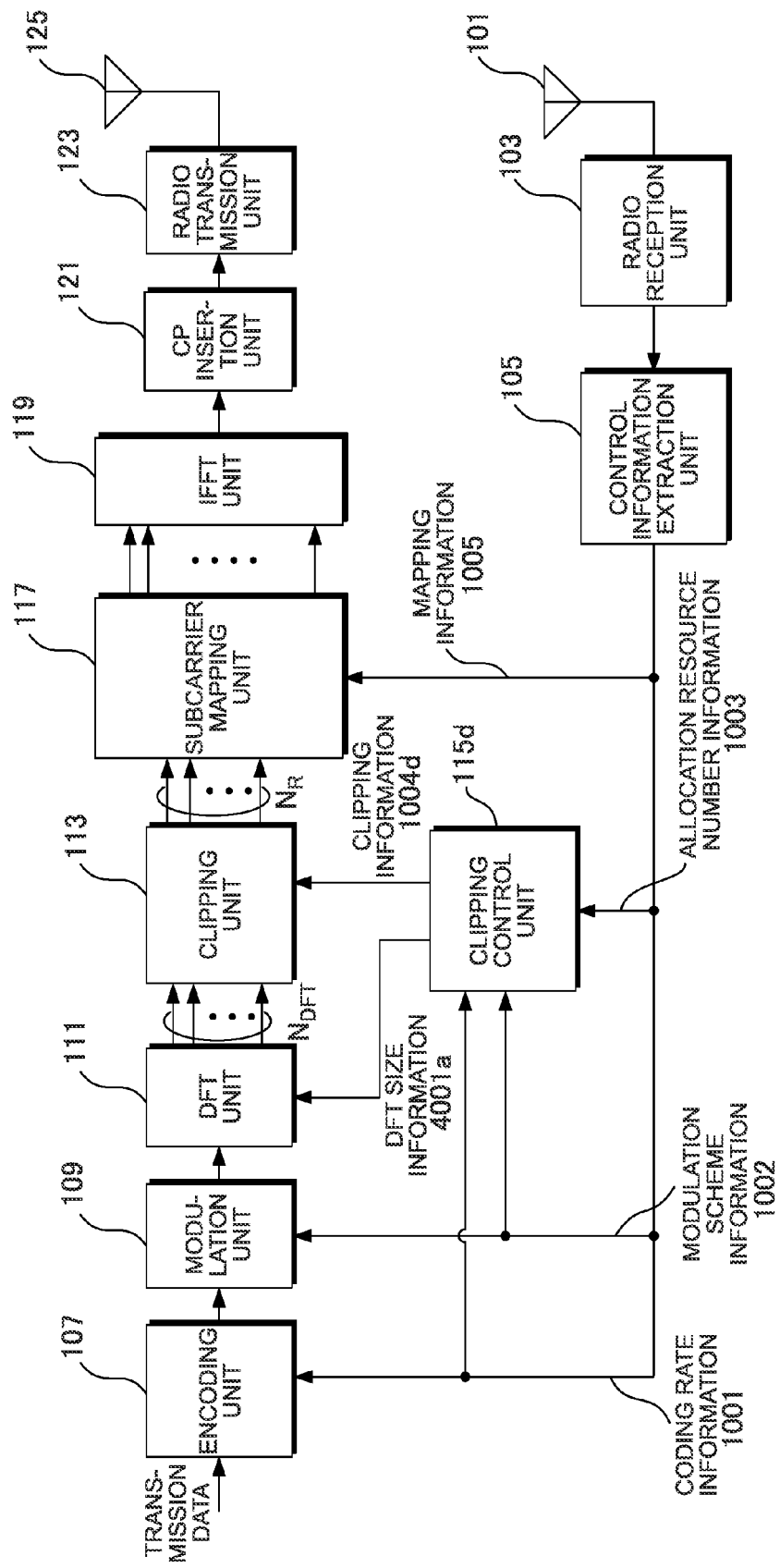
FIG. 13 is a block diagram showing an example of a wireless transmission apparatus configuration in the case where the number of allocated resources is set to the number of transmission spectra after clipping in the third embodiment of the present invention.

FIG. 13 is a block diagram showing an example of a transmitter configuration in the case where the number of allocated resources is set to the number of transmission spectra after clipping in the third embodiment of the present invention. FIG. 13 differs from FIG. 9 in that the clipping control unit 115c is replaced with a clipping control unit 115d. To the clipping control unit 115d, the coding rate information 1001, the modulation scheme information 1002, and the allocation resource number information 1003 are given from the control information extraction unit 105 as input information, and the clipping control unit 115d determines the DFT size in view of clipping and outputs DFT size information 4001a to the DFT unit 111. Further, the clipping control unit 115d determines the clipping position from the number of clippings, which is the difference between the DFT size and the number of allocated resources and outputs the position to the clipping unit 113 as clipping information 1004d.

As described above, as an example of the method for determining the DFT size $N_{DFT}$ in the case where the number of allocated resources denotes the number of transmission spectra after clipping, it is possible to calculate $N_{DFT}$ using the table indicating the relationship between P, Q, and $R_{CLIP}$ as in FIG. 12 and a formula below.

[Formula 10]

$$N_{DFT} = \max_{x \in X} \left\{ x < \left( \frac{1}{1 - R_{CLIP}(P, Q)} \cdot N_R \right) \right\} \quad \text{formula (4)}$$

Here, X is the set of natural numbers whose prime factors are expressed only by 2, 3, and 5.

FIG. 14 is a table showing an example of the clipping number determination means in the clipping control unit 115d and the clipping control unit 211c of the transmission apparatus and the reception apparatus in the third embodiment of the present invention. It may also be possible to provide tables different for each MCS as shown in FIG. 14 without using formulas, such as the formula (3) and the formula (4). As a table #1 to a table #6 in FIG. 14, for example, the table shown in FIG. 3 in the first embodiment or the table shown in FIG. 7 in the second embodiment may be used and numerical values input to the table of each MCS may be different.

In the present embodiment, it is possible to perform clipping processing in correspondence to the optimum clipping rate that changes depending on the MCS and by performing clipping based on the MCS information and the allocation resource number information already known to each of the transmission apparatus and the reception apparatus, it is possible to prevent an increase in the amount of control information due to clipping information.

Fourth Embodiment

Clipping Rate is Determined in Accordance with Rank

In the third embodiment, as a parameter with which to change the clipping rate appropriately, the MCS already known to both the transmission apparatus and the reception apparatus is used, but, it may also be possible to use another parameter notified similarly as control information and having characteristics to change the clipping rate into optimum.

In the present embodiment, the clipping rate is changed by a rank (number of streams to be transmitted simultaneously) in the MIMO transmission. In the case where the ranks are different in the same number of transmission antennas, the lower the rank, the more the transmission data rate is reduced, but, the effect of transmission diversity by applying precoding and transmitting the same data using a plurality of transmission antenna units 125 is obtained, and therefore, generally, the error rate is improved. Consequently, by setting the clipping rates or numbers of clippings that differ from rank to rank, it is possible to obtain the same effect that is obtained in the case where they are set for each MCS.

Figure 15:
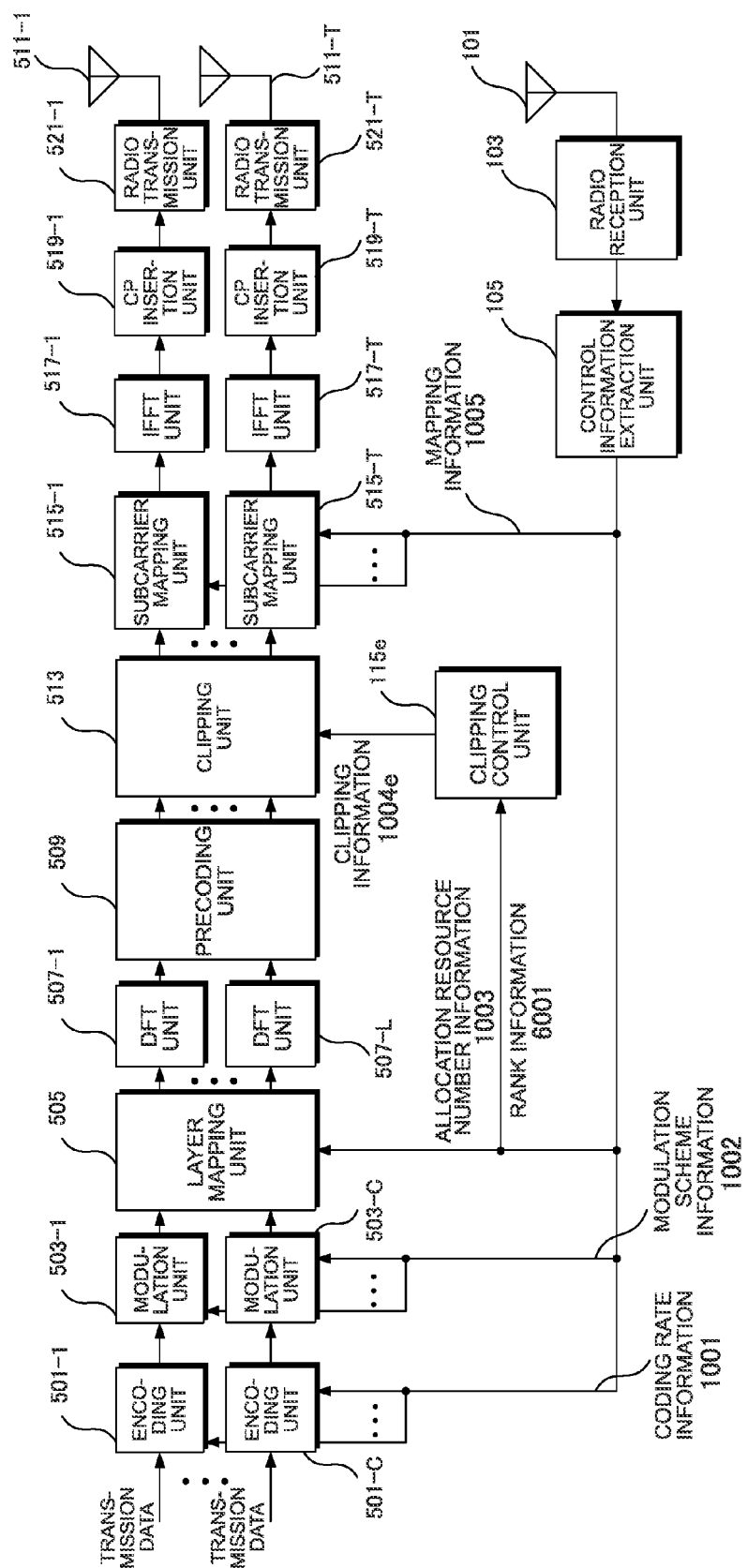
FIG. 15 is a block diagram showing an example of a transmission apparatus according to a fourth embodiment of the present invention.

FIG. 15 is a block diagram showing an example of the transmission apparatus according to the fourth embodiment of the present invention. In FIG. 15, C pieces of transmission data are input and this means that C different physical channels are multiplexed simultaneously. The input transmission data is error correction encoded in encoding units 501-1 to 501-C, and then modulated in modulation units 503-1 to 503-C. The modulated signals are input to a layer mapping unit 505 and mapped to each layer in accordance with a specified rank L. The output of each layer is input to each of DFT units 507-1 to 507-L and converted into a frequency domain signal by the DFT. A precoding unit 509 has a function to perform precoding so that the diversity effect is obtained between antenna streams and precoding is performed in the case where the rank L is lower than a number of transmission antennas T of the transmission apparatus.

Next, T signals output from the precoding unit 509 and corresponding to transmission antenna units 511-1 to 511-T, respectively, are input to a clipping unit 513 and the clipping unit 513 clips part of input signals based on clipping information 1004e output from a clipping control unit 115e and outputs the remaining signals. To the clipping control unit 115e, in addition to the allocation resource number information 1003, rank information 6001 is input of the control information output from the control information extraction unit 105 and the clipping control unit 115e determines a number of clippings $N_{CLIP4}$ based on the input control information. The clipping control unit 115e generates the clipping information 1004e identifying the clipping position using the calculated $N_{CLIP4}$ and the clipping position determination method determined in common to the transmission apparatus and the reception apparatus and outputs the generated information to the clipping unit 513.

The output signals are allocated to subcarriers used in transmission based on mapping information 1005 in subcarrier mapping units 515-1 to 515-T corresponding to the transmission antenna units 511-1 to 511-T. IFFT (Inverse Fast Fourier Transform) units 517-1 to 517-T perform the inverse Fourier transform on the transmission signals output from the subcarrier mapping units 515-1 to 515-T, respectively, and thereby the frequency domain signals are converted into time domain signals. Further, a CP is inserted in CP insertion units 519-1 to 519-T and the time domain signals are up-converted into radio frequency band signals in radio transmission units 521-1 to 521-T and transmitted from the transmission antenna units 511-1 to 511-T.

Figure 16:
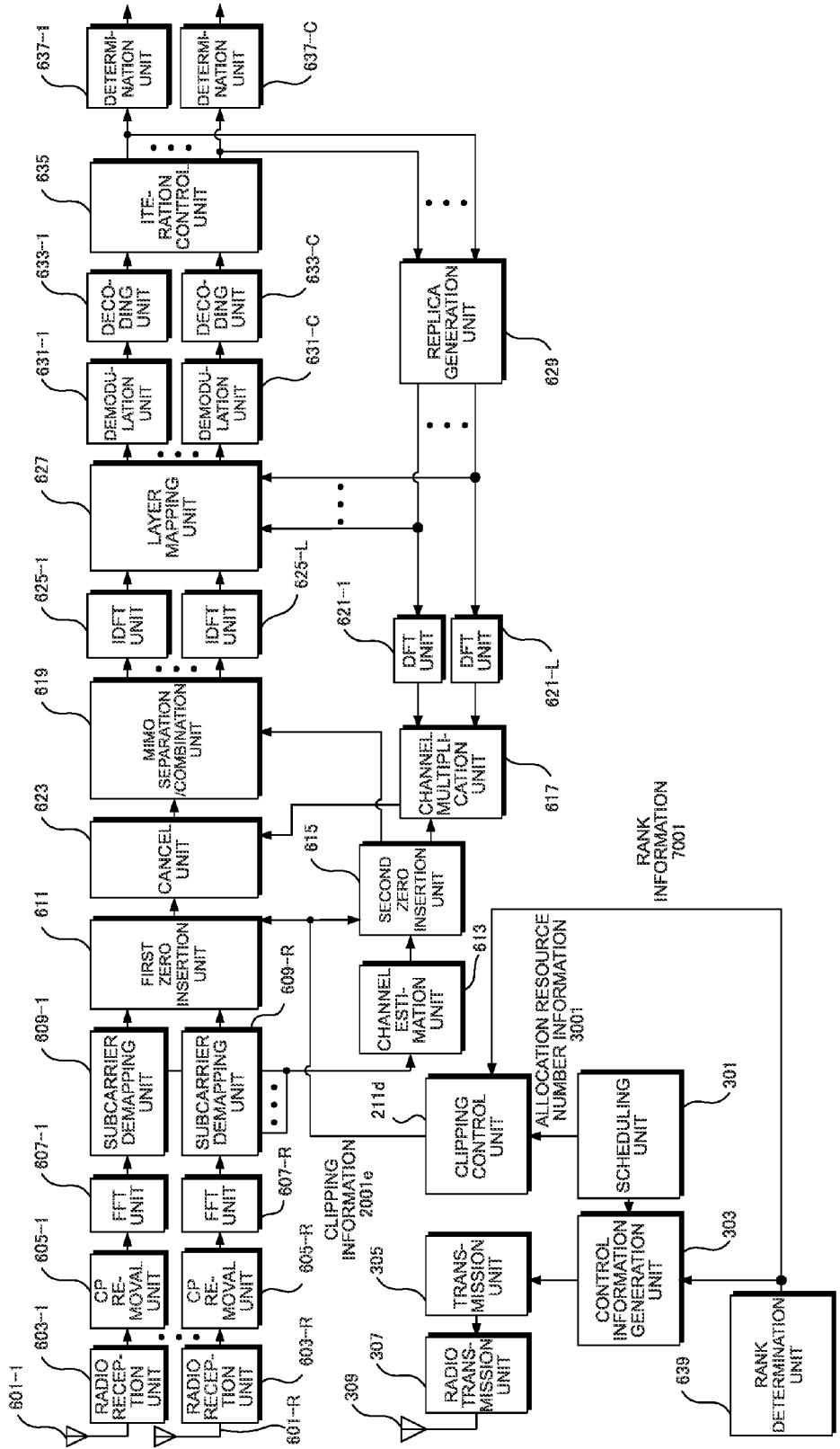
FIG. 16 is a block diagram showing an example of a wireless reception apparatus configuration according to the fourth embodiment of the present invention.

FIG. 16 is a block diagram showing an example of the wireless reception apparatus configuration according to the fourth embodiment of the present invention. In FIG. 16, for the blocks having the same function as those in FIG. 12, the same block numbers are used and explanation thereof is omitted here. The signal transmitted from the transmission apparatus is received by R reception antenna units 601-1 to 601-R (reception antenna units 601-1 to 601-R are together represented as reception antenna unit 601) and then, down-converted in radio reception units 603-1 to 603-R and after the cyclic prefix is removed in CP removal units 605-1 to 605-R, the signal is frequency-converted by the FFT in FFT units 607-1 to 607-R. Signals are extracted from frequencies to which desired transmission apparatuses are allocated by subcarrier demapping units 609-1 to 609-R. In the R frequency domain signals extracted for each reception antenna unit 601, zero is inserted into the same frequency component as the signal clipped on the transmission side in a first zero insertion unit 611 based on the clipping information given from a clipping control unit 211d.

To a channel estimation unit 613, a pilot signal for channel estimation is input and the channel estimation unit 613 calculates a channel estimation value using the input pilot signal. In the calculated channel estimation value, zero is inserted into the position of the clipped spectrum in a second zero insertion unit 615 based on clipping information 2001d given from the clipping control unit 211d. The zero-inserted channel estimation value is output to a channel multiplication unit 617 and a MIMO separation/combination unit 619. After performing the same precoding processing as that of the transmission apparatus on the frequency domain signal of each layer output from DFT units 621-1 to 621-L, the channel multiplication unit 617 multiplies the resultant signal by the zero-inserted channel estimation value input from the second zero insertion unit 615 and outputs the obtained signal to a cancel unit 623.

In the cancel unit 623, by the subtraction of the frequency domain signal given from the channel multiplication unit 617 from the frequency domain signal given from the first zero insertion unit 611, the replica of a desired signal is cancelled and the residual signal component is calculated. However, in the first processing of the cancel unit 623, no signal replica is generated, and therefore, cancel processing is not performed and the frequency domain signal given from the first zero insertion unit 611 is output as it is to the MIMO separation/combination unit 619. Signal restoration/combination is performed for each layer transmitted in the MIMO separation/combination unit 619 and the signal is input to IDFT units 625-1 to 625-L for each of L layers and is converted into a time domain signal by the IDFT.

After that, in a layer demapping unit 627, a desired signal is restored using the signal replica of each layer, which is an output of a replica generation unit 629, and after separation for each of C multiplexed physical channels is performed, demodulation is performed in demodulation units 631-1 to 631-C and error correction is performed in decoding units 633-1 to 633-C. Iteration of equalization processing is determined in an iteration control unit 635 based on the LLR input from the decoding units 633-1 to 633-C, and in the case where processing is repeated, the LLR is output to the replica generation unit 629 in order to generate a soft replica of the signal, and in the case where iteration processing is exited, the LLR is output to determination units 637-1 to 637-C and decoded bits are obtained by performing hard decision on the LLR of the information bit sequence. The replica generation unit 629 generates a soft replica of each layer in accordance with the reliability of the LLR of the coded bit. The generated replica is input to the DFT units 621-1 to 621-L, and then input to the channel multiplication unit 617 described previously. Further, the replica generation unit 629 outputs the generated replica to the layer demapping unit 627 for reconfiguration of a desired signal at the time of equalization.

The reception apparatus in FIG. 16 differs from the reception apparatus in FIG. 2 in the first embodiment in that the clipping control unit 211a is replaced with the clipping control unit 211d. The reception apparatus includes a rank determination unit 639, and rank information 7001 used in transmission is output and is input to the control information generation unit 303 and the clipping control unit 211d. The clipping control unit 211d has the same clipping number determination means as that of the clipping control unit 115e in FIG. 15 and determines the number of clippings from the input rank information 7001 and the allocation resource number information 3001 that are input. After that, by the same processing as that of the transmission apparatus, the clipping control unit 211d determines the clipping position and outputs the clipping information 2001d. Here, in the clipping processing of the same transmission chance, the "allocation resource number information 3001" and the "rank information 7001", and the "allocation resource number information 1003" and the "rank information 6001" in FIG. 15 are the same information notified as control information, respectively, and therefore, the clipping information 2001d to be output and the clipping information 1004e in FIG. 15 will also be the same information. The generated clipping information 2001d is input to the first zero insertion unit 611 and the second zero insertion unit 615 and zero insertion is performed into the clipping position in the demapped received signal and the channel estimation value.

FIG. 17 is a table showing an example of the clipping number determination means in the clipping control unit 115e and the clipping control unit 211d of the transmission apparatus and the reception apparatus according to the fourth embodiment of the present invention. To each of the clipping control units 115e and 211d, the allocation resource number information and rank information indicative of the same contents in the transmission apparatus and the reception apparatus are input. Each of the clipping control units 115e and 211d has a clipping rate table as shown in FIG. 17, in which the rank and the clipping rate are associated with each other, and if the clipping rate when rank is L denotes $R_{CLIP4}(L)$, the number of radio resources $N_{CLIP4}$ to be clipped in the clipping unit 513 is given by

[Formula 11].

$$N_{CLIP4} = \text{floor}(R_{CLIP}(L) \cdot N_R) \quad \text{formula (5)}$$

By the calculation of the number of clippings $N_{CLIP4}$ in this manner, it is possible to set the number of clippings corresponding to the rank in each of the transmission apparatus and the reception apparatus.

In the configuration example described previously, as in the first embodiment, the setting is done on the assumption that the number of allocated resources is the DFT size before clipping ($N_{DFT}=N_R$), and in the present embodiment also, it may also be possible to set the number of allocated resources to the number of transmission spectra after clipping ($N_{DFT}-N_{CLIP4}=N_R$) as in the second embodiment. As an example of the method for determining the DFT size $N_{DFT}$ in the case where the number of allocated resources is set to the number of transmission spectra after clipping as above, $N_{DFT}$ can be calculated by the table indicating the relationship between L and $R_{CLIP}$ as in FIG. 17 and a formula below.

[Formula 12]

$$N_{DFT} = \max_{x \in X}\left\{x < \left(\frac{1}{1 - R_{CLIP}(L)} \cdot N_R\right)\right\} \quad \text{formula (6)}$$

Here, X is the set of natural numbers whose prime factors are expressed only by 2, 3, and 5.

FIG. 18 is a table for explaining an example of clipping information generation according to the fourth embodiment of the present invention. It may also be possible to provide tables different for each rand as shown in FIG. 18 instead of using formulas, such as the formula (5) and the formula (6). As a table #7 to a table #10 in FIG. 18, for example, the table shown in FIG. 3 in the first embodiment, or the table shown in FIG. 7 in the second embodiment may be used and numerical values input in the table may differ from rank to rank. Further, if the information is already known to both the transmission apparatus and the reception apparatus, it is possible to obtain the same effects even in the case where the clipping rate is changed based on the number of reception antennas, for example. In the present embodiment, the case where the clipping rate (or number of clippings) is determined based on the value of the rank is explained, but, it may also be possible to determine the clipping rate (or number of clippings) by the size of a precoding matrix used in precoding to be applied in the transmission apparatus. For example, in the case where the size of the precoding matrix when the number of transmission antennas is T and the rank is L denotes T×L, if the value of T is different although the value of L is the same, it may also be possible to use a different clipping rate (or number of clippings).

In the present embodiment, it is possible to perform clipping processing in correspondence to the optimum clipping rate that changes depending on the rank of the MIMO communication, and by performing clipping based on the rank information and allocation resource number information already known to each of the transmission apparatus and the reception apparatus, it is possible to prevent an increase in the amount of control information due to clipping information.

Each of the plurality of embodiments described above may be used in combination with another. For example, the bandwidth of a radio resource to be clipped may be determined based on both the MCS shown in the third embodiment and the rank shown in the fourth embodiment and at that time, the transmission apparatus and the reception apparatus may determine the clipping rate using the clipping rate table associated with the MCS and the rank.

The program that runs in the transmission apparatus and the reception apparatus according to the present invention is a program (program causing a computer to function) for controlling a CPU etc. so as to implement the functions of the above-described embodiments according to the present invention. Then, information handled by these apparatuses is accumulated temporarily in the RAM as the time of processing thereof and then stored in various kinds of ROM and HDD, and is read by the CPU according to the necessity and modified or written. As a recording medium for storing the program, any of the semiconductor media (for example, ROM, nonvolatile memory card, etc.), optical recording media (for example, DVD, MO, MD, CD, BD, etc.), magnetic recording media (for example, magnetic tape, flexible disc, etc.), etc., may be used. The functions of the above-described embodiments are implemented not only by executing the loaded program, and there may be a case where the functions of the present invention are implemented by processing performed in cooperation with an operating system, another application program, etc., based on the instructions of the program. When the program is made available in the market, it is possible to make the program available by storing the program on a portable recording medium, or to transfer the program to a server computer connected by a network, such as the Internet. In this case, the storage apparatus of the server computer is also included in the present invention.

Further, it may also be possible to implement part or the whole of the transmission apparatus and the reception apparatus in the above-described embodiments as an LSI, which is typically an integrated circuit. It may also be possible to integrate each functional block of the transmission apparatus and the reception apparatus into an individual chip, or to integrate part or the whole thereof into a chip. The method for implementing an integrated circuit is not limited by the use of an LSI, and it may also be possible to implement by a dedicated circuit or a general-purpose processor. If a technique to implement an integrated circuit substituted for an LSI appears due to development of the semiconductor technique, it is also possible to use an integrated circuit by the new technique.

As above, the embodiments of the invention are described in detail with reference to the drawings, but, specific configurations are not limited to these embodiments and designs etc. in the scope not deviating from the gist of the present invention are also included in the scope of claims. The present invention is preferably used in a mobile communication system in which a cellular telephone is used as a reception apparatus, but, the use of the present invention is not limited to this.

DESCRIPTION OF SYMBOLS 101 reception antenna unit
103 radio reception unit
105 control information extraction unit
107 encoding unit
109 modulation unit
111 DFT unit
113 clipping unit
115, 115a, 115b, 115c, 115d, 115e clipping control unit
117 subcarrier mapping unit
119 IFFT unit
121 CP insertion unit
123 radio transmission unit
125 transmission antenna unit
201 reception antenna unit
203 radio reception unit
205 CP removal unit
207 FFT unit
209 subcarrier demapping unit
211, 211a, 211b, 211c, 211d clipping control unit
213 first zero insertion unit
215 channel estimation unit
217 second zero insertion unit
219 channel multiplication unit
221 equalization unit
223 DFT unit
225 cancel unit
227 replica generation unit
229 demodulation unit
231 decoding unit
233 iteration control unit
235 determination unit
301 scheduling unit
303 control information generation unit
401 MCS determination unit
501, 501-1, 501-C encoding unit
503, 503-1, 503-C modulation unit
505 layer mapping unit
507, 507-1, 507-L DFT unit
509 precoding unit
511, 511-1, 511-T transmission antenna unit
513 clipping unit
515, 515-1, 515-T subcarrier mapping unit
517, 517-1, 517-T IFFT unit
519, 519-1, 519-T CP insertion unit
521, 521-1, 521-T radio transmission unit
601, 601-1, 601-R reception antenna unit
603, 603-1, 603-R radio reception unit
605, 605-1, 605-R CP removal unit
607, 607-1, 607-R FFT unit
609, 609-1, 609-R subcarrier demapping unit
611 first zero insertion unit
613 channel estimation unit
615 second zero insertion unit
617 channel multiplication unit
619 MIMO separation/combination unit
621, 621-1, 621-L DFT unit
623 cancel unit
625, 625-1, 625-L IDFT unit
627 layer demapping unit
629 replica generation unit
631, 631-1, 631-C demodulation unit
633, 633-1, 633-C decoding unit
635 iteration control unit
637, 637-1, 637-C determination unit
639 rank determination unit
1001 coding rate information
1002 modulation scheme information
1003 allocation resource number information
1004, 1004a, 1004b, 1004c, 1004d, 1004e clipping information
1005 mapping information
2001, 2001a, 2001b, 2001c, 2001d clipping information
3001 allocation resource number information
4001, 4001a DFT size information
5001 coding rate information
5002 modulation scheme information
6001 rank information
7001 rank information

The invention claimed is:

1. A wireless transmission apparatus that communicates with a wireless reception apparatus, the wireless transmission apparatus comprising a processor and a memory having instructions stored thereon, the processor configured to:
receive a first information which indicates an allocated radio resource to the wireless transmission apparatus and is notified from the wireless reception apparatus;
perform clipping processing not to transmit spectra of part of a frequency domain signal;
convert the frequency domain signal after the clipping processing into a time domain signal; and
transmit the time domain signal to the reception apparatus, wherein
the spectra not transmitted are identified based on the first information;
wherein the spectra not transmitted are identified based on a table in which a bandwidth of the allocated radio resource and a bandwidth of the spectra not transmitted are associated with each other.

2. The wireless transmission apparatus according to claim 1, wherein
the spectra not transmitted are identified based on a clipping rate determined in advance between the wireless reception apparatus and the wireless transmission apparatus.

3. The wireless transmission apparatus according to claim 1, wherein
in a case where the clipping processing is performed in allocation units of the allocated radio resource, when $N_R$ denotes a number of allocation units of the allocated radio resource, $R_{CLIP}$ denotes a clipping rate determined in advance between the wireless reception apparatus and the wireless transmission apparatus, and floor (x) denotes a function expressing a maximum integer equal to or less than a real number x with respect to x, a number of clippings $N_{CLIP}$ corresponding to the number of allocation units to be subjected to the clipping processing is determined using a formula below $$N_{CLIP} = \text{floor}(R_{CLIP} \cdot N_R) \qquad \text{[Formula 1C]}.$$

4. The wireless transmission apparatus according to claim 1, wherein
a DFT (Discrete Fourier Transform) size of the frequency domain signal is determined based on a bandwidth of the allocated radio resource and a bandwidth of the spectra not transmitted.

5. The wireless transmission apparatus according to claim 4, wherein
the DFT (Discrete Fourier Transform) size of the frequency domain signal is determined based on a table in which a bandwidth of the allocated radio resource and a bandwidth of the spectra not transmitted are associated with each other.

6. The wireless transmission apparatus according to claim 4, wherein
in a case where the clipping processing is performed in allocation units of the allocated radio resource, when $N_R$ denotes a number of allocation units of the allocated radio resource, $R_{CLIP}$ denotes a clipping rate determined in advance between the wireless reception apparatus and the wireless transmission apparatus, and X denotes a set of natural numbers whose prime factors are expressed only by 2, 3, and 5, the DFT size $N_{DFT}$ is determined using a formula below

[Formula 2C]

$$N_{DFT} = \max_{x \in X}\left\{x < \left(\frac{1}{1-R_{CLIP}} \cdot N_R\right)\right\}.$$

7. The wireless transmission apparatus according to claim 1, wherein
the reception unit receives a second information which indicates an MCS (Modulation and Coding Scheme) to be applied in transmission to the wireless reception apparatus and is notified from the wireless reception apparatus; and
the spectra not transmitted are identified based on the second information.

8. The wireless transmission apparatus according to claim 7, wherein
in a case where the clipping processing is performed in allocation units of the allocated radio resource, when $N_R$ denotes a number of allocation units of the allocated radio resource, $R_{CLIP3}$ denotes a clipping rate determined in advance between the wireless reception apparatus and the wireless transmission apparatus, a clipping rate when a coding rate is P and a modulation scheme is Q denotes $R_{CLIP3}$ (P, Q), and floor (x) denotes a function expressing a maximum integer equal to or less than a real number x with respect to x, a number of clippings $N_{CLIP3}$ corresponding to the number of allocation units to be subjected to the clipping processing is determined using a formula below $N_{CLIP3}$=floor($R_{CLIP3}$(P,Q)·$N_R$)   [Formula 3C].

9. The wireless transmission apparatus according to claim 7, wherein
in a case where the clipping processing is performed in allocation units of the allocated radio resource, when $N_R$ denotes a number of allocation units of the allocated radio resource, a clipping rate when a coding rate is P and a modulation scheme is Q denotes $R_{CLIP}$ (P, Q), and X denotes a set of natural numbers whose prime factors are expressed only by 2, 3, and 5, the DFT size $N_{DFT}$ is determined using a formula below

[Formula 4C]

$$N_{DFT} = \max_{x \in X}\left\{x < \left(\frac{1}{1-R_{CLIP}(P,Q)} \cdot N_R\right)\right\}.$$

10. The wireless transmission apparatus according to claim 1, wherein
the reception unit receives a third information which indicates a rank applied in transmission to the wireless reception apparatus and is notified from the wireless reception apparatus; and
the spectra not transmitted are identified based on the third information.

11. The wireless transmission apparatus according to claim 10, wherein
in a case where the clipping processing is performed in allocation units of the allocated radio resource, when $N_R$ denotes a number of allocation units of the allocated radio resource, a clipping rate when a rank is L denotes $R_{CLIP4}$ (L), and floor (x) denotes a function expressing a maximum integer equal to or less than a real number x with respect to x, a number of clippings $N_{CLIP4}$ corresponding to the number of allocation units to be subjected to the clipping processing is determined using a formula below $N_{CLIP4}$=floor($R_{CLIP}$(L)·$N_R$)   [Formula 5C].

12. The wireless transmission apparatus according to claim 10, wherein
in a case where the clipping processing is performed in allocation units of the allocated radio resource, when $N_R$ denotes a number of allocation units of the allocated radio resource, a clipping rate when a rank is L denotes $R_{CLIP}$ (L), and X denotes a set of natural numbers whose prime factors are expressed only by 2, 3, and 5, the DFT size $N_{DFT}$ is determined using a formula below

[Formula 6C]

$$N_{DFT} = \max_{x \in X}\left\{x < \left(\frac{1}{1-R_{CLIP}(L)} \cdot N_R\right)\right\}.$$

13. A wireless communication system configured by a wireless transmission apparatus according to claim 1 and a wireless reception apparatus.

14. A wireless reception apparatus that communicates with a wireless transmission apparatus, comprising:
a scheduling unit that determines a frequency band to be subjected to clipping processing based on a first information which indicates an allocated radio resource to the wireless transmission apparatus and a radio resource clipping frequency position determination rule already know to a reception side: and
a transmission unit that transmits the first information to the transmission apparatus; and
a reception unit that receives a signal having been subjected to clipping processing not to transmit a spectra of part of a frequency domain signal on a transmission side and transmitted;
wherein the spectra not transmitted are identified based on a table in which a bandwidth of the allocated radio resource and a bandwidth of the spectra not transmitted are associated with each other.

15. A radio communication method used for a wireless transmission apparatus which is configured to and/or programmed to communicate with a wireless reception apparatus, the radio communication method comprising;
  receiving a first information which indicates an allocated radio resource to the wireless transmission apparatus and is notified from the wireless reception apparatus;
  clipping processing not to transmit spectra of part of a frequency domain signal;
  converting the frequency domain signal after the clipping processing into a time domain signal; and
  transmitting the time domain signal to the reception apparatus; wherein the spectra not transmitted are identified based on the first information;
  wherein the spectra not transmitted are identified based on a table in which a bandwidth of the allocated radio resource and a bandwidth of the spectra not transmitted are associated with each other.

16. An integrated circuit that is implemented in a wireless transmission apparatus thereby causing the wireless transmission apparatus to exhibit a plurality of functions, the integrated circuit comprising a processor and a memory having instructions stored thereon, the processor configured to:
  receive a first information which indicates an allocated radio resource to the wireless transmission apparatus and is notified from the wireless reception apparatus;
  perform clipping processing not to transmit spectra of part of a frequency domain signal;
  convert the frequency domain signal after the clipping processing into a time domain signal; and
  transmit the time domain signal to the reception apparatus; wherein
  the spectra not transmitted are identified based on the first information;
  wherein the spectra not transmitted are identified based on a table in which a bandwidth of the allocated radio resource and a bandwidth of the spectra not transmitted are associated with each other.

* * * * *